(12) United States Patent
Takayama et al.

(10) Patent No.: US 12,441,427 B2
(45) Date of Patent: Oct. 14, 2025

(54) ELECTRICAL DEVICE AND ROTATIONAL DEVICE FOR HUMAN-POWERED VEHICLE

(71) Applicant: SHIMANO INC., Sakai (JP)

(72) Inventors: Hitoshi Takayama, Sakai (JP); Junta Hamamoto, Sakai (JP); Susumu Endo, Sakai (JP)

(73) Assignee: SHIMANO INC., Sakai (JP)

( * ) Notice: Subject to any disclaimer, the term of this patent is extended or adjusted under 35 U.S.C. 154(b) by 93 days.

(21) Appl. No.: 18/306,193

(22) Filed: Apr. 24, 2023

(65) Prior Publication Data

US 2024/0351656 A1 Oct. 24, 2024

(51) Int. Cl.
*B62J 45/20* (2020.01)
*B62J 43/30* (2020.01)
*B62J 45/414* (2020.01)
*B62M 3/16* (2006.01)

(52) U.S. Cl.
CPC .............. *B62J 45/20* (2020.02); *B62J 43/30* (2020.02); *B62J 45/414* (2020.02); *B62M 3/16* (2013.01)

(58) Field of Classification Search
None
See application file for complete search history.

(56) References Cited

U.S. PATENT DOCUMENTS

| 10,456,658 B1* | 10/2019 | Doerksen | G01C 19/42 |
| 2017/0297651 A1* | 10/2017 | Tsuchizawa | B60W 10/11 |
| 2019/0118903 A1* | 4/2019 | Nishino | B62L 3/02 |
| 2020/0407012 A1* | 12/2020 | Kitano | B62K 25/286 |

FOREIGN PATENT DOCUMENTS

CN 110536153 A * 12/2019

* cited by examiner

*Primary Examiner* — Vicky A Johnson
(74) *Attorney, Agent, or Firm* — MORI & WARD, LLP

(57) ABSTRACT

An electrical device of a rotational device for a human-powered vehicle comprises an electronic controller. The electronic controller is configured to operate with first power consumption in a first state and configured to operate with second power consumption lower than the first power consumption in a second state. The electronic controller is configured to change a state of the electrical device from the first state to the second state in a case where a first sleep condition is met for a first sleep determination time in the first state. The electronic controller is configured to change the state of the electrical device from the first state to the second state in a case where a second sleep condition is met for a second sleep determination time in the first state. The second sleep determination time is shorter than the first sleep determination time.

45 Claims, 25 Drawing Sheets

ELECTRICAL DEVICE AND ROTATIONAL DEVICE FOR HUMAN-POWERED VEHICLE

BACKGROUND

Technical Field

The present invention relates to an electrical device and a rotational device for a human-powered vehicle.

Background Information

A human-powered vehicle includes a device configured to operate using electricity. One of objects of the present disclosure is to save power consumption of the device. Another of the objects of the present disclosure is to improve the accuracy of a level of charge of the electric power source. Another of the objects of the present disclosure is to protect the device from electrical operation of another device.

SUMMARY

In accordance with a first aspect of the present invention, an electrical device of a rotational device for a human-powered vehicle comprises an electronic controller. The electronic controller is configured to operate with first power consumption in a first state and configured to operate with second power consumption lower than the first power consumption in a second state. The electronic controller is configured to change a state of the electrical device from the first state to the second state in a case where a first sleep condition is met for a first sleep determination time in the first state. The electronic controller is configured to change the state of the electrical device from the first state to the second state in a case where a second sleep condition is met for a second sleep determination time in the first state. The second sleep determination time is shorter than the first sleep determination time.

With the electrical device according to the first aspect, since the second sleep determination time is shorter than the first sleep determination time, the second sleep condition can reduce time for which the electrical device again enters into the second state after change of the state from the second state to the first state. Thus, it is possible to save power consumption of the electrical device.

In accordance with a second aspect of the present invention, the electrical device according to the first aspect is configured so that the electronic controller is configured to change the state of the electrical device from the first state to the second state in a case where the electronic controller changes the state of the electrical device from the second state to the first state in response to axial acceleration defined in an axial direction parallel to the rotational axis of the rotational device.

With the electrical device according to the second aspect, it is possible to reliably save the power consumption of the electrical device in the case where the electronic controller changes the state of the electrical device from the second state to the first state in response to the axial acceleration.

In accordance with a third aspect of the present invention, an electrical device of a rotational device of a human-powered vehicle comprises an electronic controller. The electronic controller is configured to operate with first power consumption in a first state and configured to operate with second power consumption lower than the first power consumption in a second state. The electronic controller is configured to change the state of the electrical device from the second state to the first state in a case where a wake condition is met in the second state. The wake condition is free of axial acceleration defined an axial direction parallel to the rotational axis of the rotational device. The electronic controller is configured to maintain the second state in a case where the electronic controller recognizes that the axial acceleration changes in the second state.

With the electrical device according to the third aspect, it is possible to extend the second state regardless of the axial acceleration. Thus, it is possible to save the power consumption of the electrical device.

In accordance with a fourth aspect of the present invention, the electrical device according to the third aspect is configured so that the electronic controller is configured to change a state of the electrical device from the first state to the second state in a case where a first sleep condition is met for a first sleep determination time in the first state. The electronic controller is configured to change the state of the electrical device from the first state to the second state in a case where a second sleep condition is met for a second sleep determination time in the first state, the second sleep determination time being shorter than the first sleep determination time.

With the electrical device according to the fourth aspect, since the second sleep determination time is shorter than the first sleep determination time, the second sleep condition can reduce time for which the electrical device again enters into the second state after change of the state from the second state to the first state. Thus, it is possible to reliably save power consumption of the electrical device.

In accordance with a fifth aspect of the present invention, the electrical device according to any one of the first, second, and fourth aspects is configured so that the electronic controller is configured to change the state of the electrical device from the first state to the second state in a case where the second sleep condition is met for the second sleep determination time after the electronic controller changes the state of the electrical device from the second state to the first state.

With the electrical device according to the fifth aspect, it is possible to reduce time for which the electrical device again enters into the second state after change of the state from the second state to the first state. Thus, it is possible to reliably save power consumption of the electrical device.

In accordance with a sixth aspect of the present invention, the electrical device according to any one of the first, second, fourth, and fifth aspects is configured so that the electronic controller is configured to maintain the first state in a case where the second sleep condition is not met before the second sleep determination time elapses after the electronic controller changes the state of the electrical device from the second state to the first state.

With the electrical device according to the sixth aspect, it is possible to utilize the first state without entering the second state unintentionally.

In accordance with a seventh aspect of the present invention, the electrical device according to any one of the first, second, and fourth to sixth aspects is configured so that the electronic controller is configured to change the state of the electrical device from the first state to the second state in a case where the first sleep condition is met for the first sleep determination time after the second sleep condition is not met.

With the electrical device according to the seventh aspect, it is possible to reduce time of the first state using the first sleep condition. Thus, it is possible to reliably save power consumption of the electrical device.

In accordance with an eighth aspect of the present invention, the electrical device according to any one of the first, second, and fourth to seventh aspects is configured so that the electronic controller is configured to maintain the first state in a case where the first sleep condition is not met before the first sleep determination time elapses after the second sleep condition is not met.

With the electrical device according to the eighth aspect, it is possible to utilize the first state without entering the second state unintentionally.

In accordance with a ninth aspect of the present invention, the electrical device according to any one of the first, second, and fourth to eighth aspects is configured so that the first sleep condition includes that an amount of change in a rotational position sensed by a position sensor is less than a first movement threshold and that a force sensed by a force sensor is lower than a first force threshold.

With the electrical device according to the ninth aspect, the first sleep condition can reduce the time for which the electrical device again enters into the second state after change of the state from the second state to the first state, for example, in a case where the electrical device is not in use after the second sleep condition is not met. Thus, it is possible to reliably save power consumption of the electrical device.

In accordance with a tenth aspect of the present invention, the electrical device according to the ninth aspect is configured so that the electronic controller is configured to change the state of the electrical device from the first state to the second state in a case where the amount of change in the rotational position sensed by the position sensor is less than the first movement threshold and where the force sensed by the force sensor is lower than the first force threshold.

With the electrical device according to the tenth aspect, it is possible to reliably save power consumption of the electrical device.

In accordance with an eleventh aspect of the present invention, the electrical device according to any one of the first, second, and fourth to tenth aspects is configured so that the second sleep condition includes that an amount of change in a rotational position sensed by a position sensor is less than a second movement threshold and that a force sensed by a force sensor is lower than a second force threshold.

With the electrical device according to the eleventh aspect, the second sleep condition can reduce the time for which the electrical device again enters into the second state after change of the state from the second state to the first state, for example, in a case where the electrical device is not in use before determination of the first sleep condition. Thus, it is possible to reliably save power consumption of the electrical device.

In accordance with a twelfth aspect of the present invention, the electrical device according to the eleventh aspect is configured so that the electronic controller is configured to change the state of the electrical device from the first state to the second state in a case where the amount of change in the rotational position sensed by the position sensor is less than the second movement threshold and where the force sensed by the force sensor is lower than the second force threshold.

With the electrical device according to the twelfth aspect, it is possible to reliably save power consumption of the electrical device.

In accordance with a thirteenth aspect of the present invention, the electrical device according to any one of the first, second, and fourth to twelfth aspects further comprises the position sensor configured to sense a rotational position of the rotational device.

With the electrical device according to the thirteenth aspect, it is possible to obtain the rotational position of the rotational device using the position sensor.

In accordance with a fourteenth aspect of the present invention, the electrical device according to the thirteenth aspect is configured so that the position sensor is provided on a longitudinal line. The longitudinal line is defined to intersect with a rotational axis of the rotational device and a center axis of a pedal attachment hole of the rotational device.

With the electrical device according to the fourteenth aspect, it is possible to reduce a difference between an actual rotational position of the rotational device and the rotational position sensed by the position sensor. Thus, it is possible to improve the accuracy of the position sensor compared to a case where a position of the position sensor is offset from the longitudinal line.

In accordance with a fifteenth aspect of the present invention, the electrical device according to the thirteenth or fourteenth aspect is configured so that the position sensor includes an accelerometer. The accelerometer is configured to sense radial acceleration defined in a radial direction with respect to a rotational axis of the rotational device, rotational acceleration defined in a rotational direction with respect to the rotational axis, and axial acceleration defined an axial direction parallel to the rotational axis of the rotational device.

With the electrical device according to the fifteenth aspect, it is possible to improve the accuracy of the position sensor.

In accordance with a sixteenth aspect of the present invention, the electrical device according to the fifteenth aspect is configured so that the first movement threshold includes a first radial acceleration threshold and a first rotational acceleration threshold. The first sleep condition includes that an amount of change in the radial acceleration is less than the first radial acceleration threshold and that an amount of change in the rotational acceleration is less than the first rotational acceleration threshold.

With the electrical device according to the sixteenth aspect, it is possible to accurately determine the movement of the electrical device based on the first sleep condition. Thus, it is possible to reliably save the power consumption of the electrical device.

In accordance with a seventeenth aspect of the present invention, the electrical device according to the fifteenth or sixteenth aspect is configured so that the electronic controller is configured to change the state of the electrical device from the first state to the second state regardless of the axial acceleration, in a case where the amount of change in the radial acceleration is less than the first radial acceleration threshold for the first sleep determination time and where the amount of change in the rotational acceleration is less than the first rotational acceleration threshold for the first sleep determination time.

With the electrical device according to the seventeenth aspect, it is possible to reduce time of the first state using the first sleep condition regardless of the axial acceleration. Thus, it is possible to reliably save power consumption of the electrical device.

In accordance with an eighteenth aspect of the present invention, the electrical device according to the seventeenth aspect is configured so that the second movement threshold includes a second radial acceleration threshold and a second rotational acceleration threshold. The second sleep condition includes that the amount of change in the radial acceleration is less than the second radial acceleration threshold and that the amount of change in the rotational acceleration is less than the second rotational acceleration threshold.

With the electrical device according to the eighteenth aspect, it is possible to accurately determine the movement of the electrical device based on the second sleep condition. Thus, it is possible to reliably save the power consumption of the electrical device.

In accordance with a nineteenth aspect of the present invention, the electrical device according to any one of the fifteenth to eighteenth aspects is configured so that the electronic controller is configured to change the state of the electrical device from the first state to the second state regardless of the axial acceleration, in a case where the amount of change in the radial acceleration is less than the second radial acceleration threshold for the second sleep determination time and where the amount of change in the rotational acceleration is less than the second rotational acceleration threshold for the second sleep determination time.

With the electrical device according to the nineteenth aspect, it is possible to reduce time of the first state using the second sleep condition regardless of the axial acceleration. Thus, it is possible to reliably save power consumption of the electrical device.

In accordance with a twentieth aspect of the present invention, the electrical device according to any one of the first to nineteenth aspects is configured so that the electronic controller is configured to change the state of the electrical device from the second state to the first state in a case where a wake condition is met in the second state.

With the electrical device according to the twentieth aspect, it is possible to activate the electrical device depending on the wake condition. Thus, it is possible to save the power consumption of the electrical device while improving usability of the electrical device.

In accordance with a twenty-first aspect of the present invention, the electrical device according to the twentieth aspect is configured so that the wake condition includes at least one of that an amount of change in radial acceleration defined in a radial direction with respect to a rotational axis of the rotational device is greater than a radial acceleration threshold and that an amount of change in rotational acceleration defined in a rotational direction with respect to the rotational axis is greater than a rotational acceleration threshold.

With the electrical device according to the twenty-first aspect, the wake condition can activate the electrical device, for example, in a case where the electrical device is in use. Thus, it is possible to reliably save power consumption of the electrical device while improving usability of the electrical device.

In accordance with a twenty-second aspect of the present invention, the electrical device according to the twenty-first aspect is configured so that the electronic controller is configured to change the state of the electrical device from the second state to the first state in at least one of a case where the amount of change in the radial acceleration is greater than the radial acceleration threshold and a case where the amount of change in the rotational acceleration is greater than the rotational acceleration threshold.

With the electrical device according to the twenty-second aspect, it is possible to more reliably save power consumption of the electrical device while improving usability of the electrical device.

In accordance with a twenty-third aspect of the present invention, an electrical device of a rotational device for a human-powered vehicle comprises a power-source sensor, an electric component, and an electronic controller. The power-source sensor is configured to sense an output voltage of an electric power source. The electric component is configured to be powered by the electric power source. The electronic controller is electrically connected to the power-source sensor to obtain the output voltage sensed by the power-source sensor in response to power supply from the electric power source to the electric component. The electronic controller is configured to calculate a level of charge of the electric power source based on the output voltage.

With the electrical device according to the twenty-third aspect, it is possible to improve the accuracy of the level of charge of the electric power source based on the output voltage.

In accordance with a twenty-fourth aspect of the present invention, the electrical device according to the twenty-third aspect is configured so that the electronic controller is configured to obtain, as a first output voltage, the output voltage sensed by the power-source sensor in response to the power supply. The electronic controller is configured to obtain, as a second output voltage, the output voltage sensed by the power-source sensor in response to decrease in the power supply. The electronic controller is configured to calculate the level of charge of the electric power source based on the first output voltage and the second output voltage.

With the electrical device according to the twenty-fourth aspect, it is possible to reliably improve the accuracy of the level of charge of the electric power source based on the first output voltage and the second output voltage.

In accordance with a twenty-fifth aspect of the present invention, the electrical device according to the twenty-third or twenty-fourth aspect is configured so that the electric component includes a wireless communicator. The electronic controller is configured to obtain the output voltage sensed by the power-source sensor in response to power supply from the electric power source to the wireless communicator.

With the electrical device according to the twenty-fifth aspect, it is possible to reliably improve the accuracy of the level of charge of the electric power source using the power supply to the wireless communicator.

In accordance with a twenty-sixth aspect of the present invention, the electrical device according to any one of the twenty-third to twenty-fifth aspects is configured so that the electric component includes a light emitter. The electronic controller is configured to obtain the output voltage sensed by the power-source sensor in response to power supply from the electric power source to the light emitter.

With the electrical device according to the twenty-sixth aspect, it is possible to reliably improve the accuracy of the level of charge of the electric power source using the power supply to the light emitter.

In accordance with a twenty-seventh aspect of the present invention, the electrical device according to any one of the twenty-third to twenty-sixth aspects is configured so that the level of charge includes a state-of-charge of the electric power source. The electronic controller is configured to calculate the state-of-charge based on the output voltage.

With the electrical device according to the twenty-seventh aspect, it is possible to obtain the state-of-charge of the electric power source based on the output voltage.

In accordance with a twenty-eighth aspect of the present invention, an electrical device of a rotational device for a human-powered vehicle comprises: an electric power source which is rechargeable; a connector port to which a charging power source is electrically connected; and an electronic controller. The electronic controller is configured to be powered by the charging power source without being powered by the electric power source in a state where electricity is supplied from the charging power source to the connector port.

With the electrical device according to the twenty-eighth aspect, it is possible to utilize electricity supplied from the charging power source to power the electronic controller. Thus, it is possible to save the power consumption of the electric power source.

In accordance with a twenty-ninth aspect of the present invention, the electrical device according to the twenty-eighth aspect is configured so that the electric power source is electrically connected to the connector port. The electronic controller is configured to control supply of electricity from the charging power source to the electric power source via the connector port.

With the electrical device according to the twenty-ninth aspect, it is possible to reliably utilize electricity supplied from the charging power source to power the electronic controller. Thus, it is possible to reliably save the power consumption of the electric power source.

In accordance with a thirtieth aspect of the present invention, the electrical device according to the twenty-ninth aspect is configured so that the electronic controller is configured to be powered by the electric power source in a state where electricity is not supplied from the charging power source to the connector port.

With the electrical device according to the thirtieth aspect, it is possible to efficiently utilize electricity of the electric power source. Thus, it is possible to reliably save the power consumption of the electric power source.

In accordance with a thirty-first aspect of the present invention, the electrical device according to the thirtieth aspect is configured so that the electronic controller is configured to be powered by the charging power source in a state where electricity is supplied from the charging power source to the electric power source via the connector port.

With the electrical device according to the thirty-first aspect, it is possible to more reliably save the power consumption of the electric power source.

In accordance with a thirty-second aspect of the present invention, an electrical device for a human-powered vehicle comprises: a connector port to which an electric cable is detachably connected; an electronic controller; and a protection circuit. The electronic controller is electrically connected to the connector port to communicate with a first external electrical device via the connector port and the electric cable. The protection circuit is electrically connected to the connector port to restrict electrical operation from a second external electrical device to the electronic controller via the connector port.

With the electrical device according to the thirty-second aspect, it is possible to protect the electrical device from the electrical operation of the second external electrical device.

In accordance with a thirty-third aspect of the present invention, the electrical device according to the thirty-second aspect is configured so that the electrical operation includes at least one of power supply and electric communication.

With the electrical device according to the thirty-third aspect, it is possible to protect the electrical device from the at least one of the power supply and the electric communication of the second external electrical device.

In accordance with a thirty-fourth aspect of the present invention, the electrical device according to the thirty-second or thirty-third aspect is configured so that the protection circuit is electrically connected to the connector port to allow communication between the electronic controller and the first external electrical device.

With the electrical device according to the thirty-fourth aspect, it is possible to protect the electrical device from the electrical operation of the second external electrical device while allowing the communication between the electronic controller and the first external electrical device.

In accordance with a thirty-fifth aspect of the present invention, the electrical device according to any one of the thirty-second to thirty-fourth aspects is configured so that the connector port includes a first line electrically connected to the electronic controller. The protection circuit includes a first pull-up resistor electrically connected to the first line.

With the electrical device according to the thirty-fifth aspect, it is possible to pull up a voltage applied to the first line. Thus, it is possible to effectively protect the electrical device.

In accordance with a thirty-sixth aspect of the present invention, the electrical device according to the thirty-fifth aspect is configured so that the first pull-up resistor has a first resistance value. The first resistance value is higher than or equal to 100 k$\Omega$.

With the electrical device according to the thirty-sixth aspect, it is possible to reliably protect the electrical device.

In accordance with a thirty-seventh aspect of the present invention, the electrical device according to the thirty-fifth or thirty-sixth aspect is configured so that the connector port includes a second line electrically connected to the electronic controller. The protection circuit includes a second pull-up resistor electrically connected to the second line.

With the electrical device according to the thirty-seventh aspect, it is possible to pull up a voltage applied to the second line. Thus, it is possible to effectively protect the electrical device.

In accordance with a thirty-eighth aspect of the present invention, the electrical device according to the thirty-seventh aspect is configured so that the second pull-up resistor has a second resistance value. The second resistance value is higher than or equal to 100 k$\Omega$.

With the electrical device according to the thirty-eighth aspect, it is possible to reliably protect the electrical device.

In accordance with a thirty-ninth aspect of the present invention, the electrical device according to the thirty-seventh or thirty-eighth aspect is configured so that the first pull-up resistor has a first resistance value. The second pull-up resistor has a second resistance value. The second resistance value is equal to the first resistance value.

With the electrical device according to the thirty-ninth aspect, it is possible to reliably protect the electrical device.

In accordance with a fortieth aspect of the present invention, the electrical device according to any one of the thirty-second to thirty-ninth aspects is configured so that the electronic controller includes a communicator circuit configured to communicate with the first external electrical device via the connector port based on asynchronous serial communication.

With the electrical device according to the fortieth aspect, it is possible to reliably protect the electrical device configured to communicate based on the asynchronous serial communication.

In accordance with a forty-first aspect of the present invention, a rotational device for a human-powered vehicle comprises a crank arm and the electrical device according to any one of the first to fortieth aspects.

With the rotational device according to the forty-first aspect, it is possible to apply the electrical device to the crank arm.

In accordance with a forty-second aspect of the present invention, the rotational device according to the forty-first aspect is configured so that the electrical device is at least partially provided to the crank arm.

With the rotational device according to the forty-second aspect, it is possible to utilize the crank arm as a place where the electrical device is provided.

In accordance with a forty-third aspect of the present invention, the rotational device according to the forty-first or forty-second aspect further comprises a crank axle and a sprocket. The crank arm is secured to the crank axle.

With the rotational device according to the forty-third aspect, it is possible to apply the electrical device to a crank assembly.

In accordance with a forty-fourth aspect of the present invention, the rotational device according to the forty-third aspect is configured so that the electrical device is at least partially provided to at least one of the crank axle, the crank arm, and the sprocket.

With the rotational device according to the forty-fourth aspect, it is possible to utilize at least one of the crank axle, the crank arm, and the sprocket as a place where the electrical device is provided.

In accordance with a forty-fifth aspect of the present invention, a rotational device for a human-powered vehicle comprises a pedal axle, a pedal body, and the electrical device according to any one of the first to fortieth aspects. The pedal body is rotatably coupled to the pedal axle.

With the rotational device according to the forty-fifth aspect, it is possible to apply the electrical device to a pedal.

In accordance with a forty-sixth aspect of the present invention, the rotational device according to the forty-fifth aspect is configured so that the electrical device is at least partially provided to at least one of the pedal axle and the pedal body.

With the rotational device according to the forty-sixth aspect, it is possible to utilize at least one of the pedal axle and the pedal body as a place where the electrical device is provided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
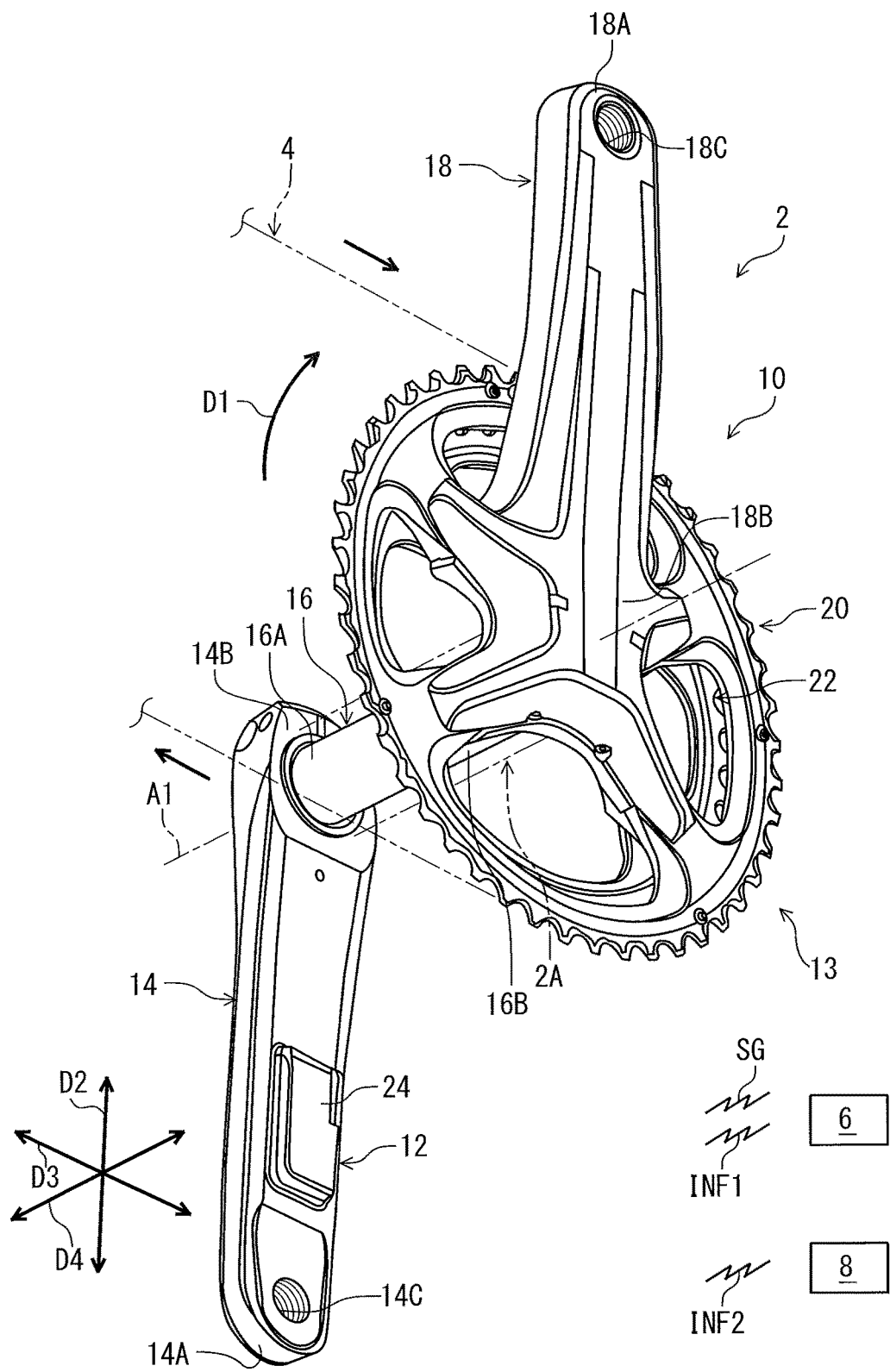
FIG. 1 is a perspective view of a rotational device of a human-powered vehicle in accordance with a first embodiment.

The embodiments will now be described with reference to the accompanying drawings, wherein like reference numerals designate corresponding or identical elements throughout the various drawings.

First Embodiment

As seen in FIG. 1, a human-powered vehicle 2 includes a rotational device 10 in accordance with a first embodiment. The rotational device 10 for the human-powered vehicle 2 comprises an electrical device 12. Examples of the rotational device 10 include a crank assembly, a pedal, a hub assembly, and a wheel. Examples of the electrical device 12 includes a crank power meter, a pedal power meter, a hub power meter, a sensor (e.g., a cadence sensor) provided to a crank assembly, and a sensor (e.g., a speed sensor) provided to a hub assembly or a wheel. In the present embodiment, the rotational device 10 includes a crank assembly 13. The electrical device 12 includes a crank power meter. However, the rotational device 10 can include other devices such as a pedal, a hub assembly, and a wheel if needed and/or desired. The electrical device 12 can include other devices such as a pedal power meter, a hub power meter, a sensor (e.g., a cadence sensor) provided to a crank assembly, and a sensor (e.g., a speed sensor) provided to a hub assembly or a spoke of a wheel if needed and/or desired.

In the present application, the term "human-powered vehicle" includes a vehicle to travel with a motive power including at least a human power of a user (i.e., rider) who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

As seen in FIG. 1, the rotational device 10 is rotatable relative to a vehicle body 2A of the human-powered vehicle 2 about a rotational axis A1. The rotational device 10 is rotatable relative to the vehicle body 2A of the human-powered vehicle 2 about the rotational axis A1 in a driving rotational direction D1 during pedaling. The rotational device 10 for the human-powered vehicle 2 comprises a crank arm 14. The rotational device 10 further comprises a crank axle 16. The crank arm 14 is secured to the crank axle 16. The rotational device 10 further comprises a crank arm 18. The crank assembly 13 includes the crank arm 14, the crank axle 16, and the crank arm 18. The crank arm 18 is secured to the crank axle 16. The crank arm 14, the crank axle 16, and the crank arm 18 are rotatable relative to the vehicle body 2A of the human-powered vehicle 2 in the driving rotational direction D1.

The rotational device 10 further comprises a sprocket 20. The rotational device 10 further comprises a sprocket 22. The sprocket 20 is configured to engage with a chain 4. The sprocket 22 is configured to engage with the chain 4. The sprocket 20 or 22 is configured to transmit a driving force to another sprocket such as a rear sprocket via the chain 4. The sprocket 20 is secured to at least one of the crank axle 16 and the crank arm 18. The sprocket 22 is secured to at least one of the crank axle 16, the crank arm 18, and the sprocket 20. The sprocket 22 can be omitted from the rotational device 10 if needed and/or desired.

The crank axle 16 includes a first axle end 16A and a second axle end 16B. The crank axle 16 extends between the first axle end 16A and the second axle end 16B along the rotational axis A1. The crank arm 14 is secured to the first axle end 16A. The crank arm 18 is secured to the second axle end 16B.

The crank arm 14 includes has a first end 14A and a second end 14B. The crank arm 14 extends between the first end 14A and the second end 14B. The first end 14A includes a pedal attachment hole 14C to which a pedal is attachable. The second end 14B is secured to the first axle end 16A of the crank axle 16. Examples of the pedal include a binding pedal, a clipless pedal, and a general pedal.

The crank arm 18 includes has a first end 18A and a second end 18B. The crank arm 18 extends between the first end 18A and the second end 18B. The first end 18A includes a pedal attachment hole 18C to which a pedal is attachable. The second end 18B is secured to the first axle end 16A of the crank axle 16.

In the present embodiment, the crank arm 14 is a left crank arm while the crank arm 18 is a right crank arm. However, the crank arm 14 can be a right crank arm if needed and/or desired. The crank arm 18 can be a left crank arm if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or a steering. Accordingly, these terms, as utilized to describe the rotational device 10, the electrical device 12, or other components, should be interpreted relative to the human-powered vehicle 2 equipped with the rotational device 10, the electrical device 12, or other components as used in an upright riding position on a horizontal surface.

The electrical device 12 is at least partially provided to at least one of the crank axle 16, the crank arm 14, and the sprocket 20 and/or 22. The electrical device 12 is at least partially provided to the crank arm 14. In the present embodiment, the electrical device 12 is entirely provided to the crank arm 14. The electrical device 12 is provided between the first end 14A and the second end 14B. The electrical device 12 is attached to an outer surface of the crank arm 14. However, the electrical device 12 can be at least partially provided inside the crank arm 14 if needed and/or desired. The electrical device 12 can be at least partially provided to at least one of the crank axle 16, the crank arm 18, and the sprocket 20 and/or 22 if needed and/or desired.

Figure 2:
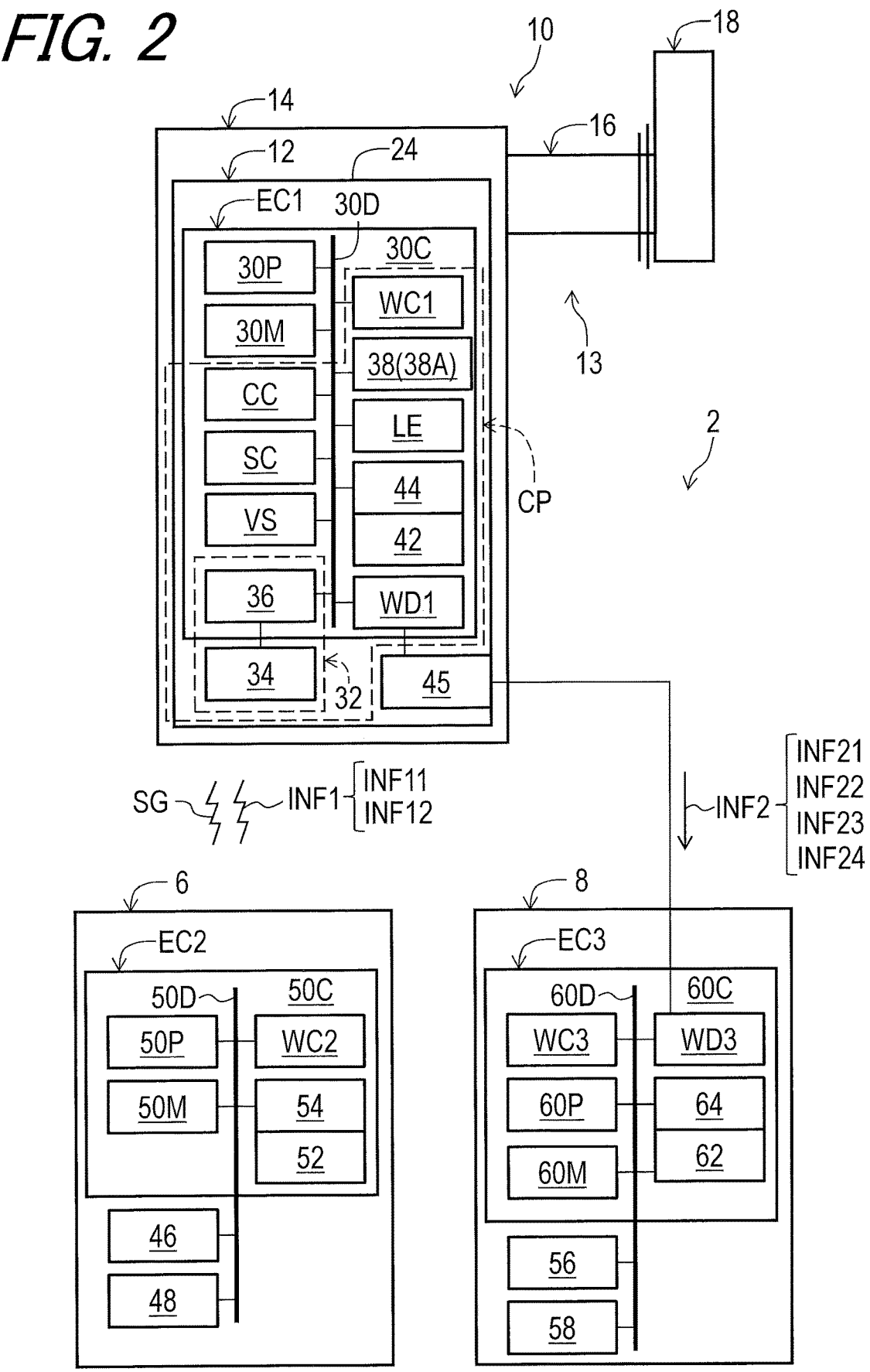
FIG. 2 is a schematic block diagram of the rotational device illustrated in FIG. 1.

As seen in FIG. 2, the electrical device 12 includes the wireless communicator WC1. The wireless communicator WC1 is configured to wirelessly communicate with an additional wireless communicator WC2 of an additional electrical device 6. The wireless communicator WC1 is configured to wirelessly communicate with an external wireless communicator WC3 of an external electrical device 8. The wireless communicator WC1 is configured to wirelessly transmit rotational information INF1 relating to the rotational device 10. The external electrical device 8 can also be referred to as a second external electrical device 8.

The electrical device 12 of the rotational device 10 for the human-powered vehicle 2 comprises an electronic controller EC1. The electrical device 12 for the human-powered vehicle 2 comprises the electronic controller EC1. The electronic controller EC1 is electrically connected to the wireless communicator WC1. The electrical device 12 includes a housing 24. The wireless communicator WC1 and the electronic controller EC1 are provided in the housing 24. As seen in FIG. 1, the housing 24 is attached to the crank assembly 13. The housing 24 is attached to the crank arm 14.

The electronic controller EC1 includes a hardware processor 30P, a hardware memory 30M, and a circuit board 30C, and a bus 30D. The hardware processor 30P is coupled to the hardware memory 30M. The hardware memory 30M is coupled to the hardware processor 30P. The hardware processor 30P and the hardware memory 30M are electrically mounted on the circuit board 30C. The hardware processor 30P is electrically connected to the hardware memory 30M via the circuit board 30C and the bus 30D. The hardware memory 30M is electrically connected to the hardware processor 30P via the circuit board 30C and the bus 30D. The bus 30D is provided on the circuit board 30C. For example, the electronic controller EC1 includes a semiconductor. The hardware processor 30P includes a semiconductor. The hardware memory 30M includes a semiconductor.

For example, the hardware processor 30P includes at least one of a central processing unit (CPU), a micro processing unit (MPU), and a memory controller. The hardware memory 30M is electrically connected to the hardware processor 30P. For example, the hardware memory 30M includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a hard disc drive (HDD). The hardware memory 30M includes storage areas each having an address. The hardware processor 30P is configured to control the hardware memory 30M to store data in the storage areas of the hardware memory 30M and reads data from the storage areas of the hardware memory 30M. The hardware memory 30M can also be referred to as a computer-readable storage medium 30M.

The electronic controller EC1 is programed to execute at least one control algorithm of the electrical device 12. The hardware memory 30M (e.g., the ROM) stores at least one program including at least one program instruction. The at least one program is read into the hardware processor 30P, and thereby the at least one control algorithm of the electrical device 12 is executed based on the at least one program. The electronic controller EC1 can also be referred to as an electronic controller circuit or circuitry EC1. The electronic controller EC1 can also be referred to as a hardware electronic controller EC1. The structure of the electronic controller EC1 is not limited to the above structure. The structure of the electronic controller EC1 is not limited to the hardware processor 30P, the hardware memory 30M, and the bus 30D. The electronic controller EC1 can be realized by hardware alone or a combination of hardware and software. The hardware processor 30P and the hardware memory 30M can be integrated as a one chip such as an application specific integrated circuit (ASIC) or a field programmable gate array (FPGA).

As seen in FIG. 2, the wireless communicator WC1 is electrically connected to the hardware processor 30P and the hardware memory 30M with the circuit board 30C and the bus 30D. The wireless communicator WC1 is electrically mounted on the circuit board. The wireless communicator WC1 includes a signal transmitting circuit or circuitry, a signal receiving circuit or circuitry, and an antenna. Thus, the wireless communicator WC1 can also be referred to as a wireless communicator circuit or circuitry WC1.

The wireless communicator WC1 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the wireless communicator WC1 is configured to encrypt signals using a cryptographic key to generate encrypted wireless signals. The wireless communicator WC1 is configured to transmit wireless signals via the antenna. The wireless communicator WC1 can be a one-way wireless communication device such as a receiver, or a two-way wireless communication device such as a transceiver.

The wireless communicator WC1 is configured to receive wireless signals via the antenna. In the present embodiment, the wireless communicator WC1 is configured to decode the wireless signals to recognize signals transmitted from other wireless communicators. The wireless communicator WC1 is configured to decrypt the wireless signals using the cryptographic key.

The electronic controller EC1 includes a communicator circuit WD1. The communicator circuit WD1 is configured to communicate with another communicator circuit of another electric device (e.g., the external electrical device 8) via the connector port 45 and an electric cable 31. For example, the communicator circuit WD1 is configured to communicate with the external electrical device 8 via the connector port 45 and the electric cable 31 using a power line communication (PLC) technology. The communicator circuit WD1 can also be referred to as a weird communicator WD1. The PLC includes a Universal Serial Bus (USB). The electric cable 31 includes a USB cable. However, the electric cable 31 can include cables other than the USB cable if needed and/or desired.

The PLC is used for communicating between electric devices. The PLC carries data on a conductor that is also used simultaneously for electric power transmission or electric power distribution to the electric device. In the present embodiment, the electric power is supplied from an external power source (e.g., an electric power source of the external electrical device 8) to the electrical device 12 through the electric cable 31. Furthermore, the electrical device 12 is configured to receive information signals from another electric device through the electric cable 31 using the PLC. The communicator circuit WD1 is electrically connected to the electronic controller EC1. The communicator circuit WD1 is configured to separate input signals to a power source voltage and control signals. The communicator circuit WD1 is configured to superimpose output signals on the power source voltage applied to the electric cable 31 from the external power source. The communicator circuit WD1 is configured to control the power source voltage to a level at which the electrical device 12 can properly operate.

The PLC uses unique identifying information such as a unique identifier that is assigned to each of electric devices. Each of the electrical device 12 and the external electrical device 8 is configured to store the unique identifying information. Based on the unique identifying information, the electrical device 12 is configured to recognize, based on the unique identifying information, information signals which are necessary for itself among information signals transmitted via the electric cable 31. For example, the electrical device 12 is configured to recognize information signals transmitted from the external electrical device 8 through the electric cable 31. The electrical device 12 is configured to transmit information signals to the external electrical device 8 through the electric cable 31. Instead of using the PLC technology, however, separate signal wires can be provided for transmitting data in addition to the ground wire and the voltage wire if needed and/or desired. The rotational device 10 can be configured to wirelessly communicate with another electric device if needed and/or desired.

As seen in FIG. 2, the electrical device 12 further comprises a force sensor 32. The force sensor 32 is configured to obtain the rotational information INF1. The electronic controller EC1 is configured to receive the rotational information INF obtained by the force sensor 32. The electronic controller EC1 is electrically connected to the force sensor 32 to receive the rotational information INF obtained by the force sensor 32.

The rotational information INF includes at least one of: power applied to the rotational device 10, a deformation amount of the rotational device 10; a force applied to the rotational device 10; a rotational position of the rotational device 10; and the rotational speed (e.g., a cadence) of the rotational device 10. The force sensor 32 is configured to obtain at least one of: the deformation amount of the rotational device 10; the force applied to the rotational device 10; and the rotational speed (e.g., a cadence) of the rotational device 10. The rotational information INF includes at least one of: the deformation amount of the rotational device 10; and the force applied to the rotational device 10. The force sensor 32 is configured to obtain at least one of: the deformation amount of the rotational device 10; and the force applied to the rotational device 10.

In the present embodiment, the rotational information INF includes the deformation amount of the rotational device 10. The force sensor 32 is configured to obtain the deformation amount of the rotational information INF1. The rotational information INF1 includes a deformation amount of the crank arm 14 as the deformation amount of the rotational device 10. The force sensor 32 is configured to obtain the deformation amount of the crank arm 14 as the deformation amount of the rotational device 10. However, the rotational information INF can include a deformation amount of another part of the rotational device 10 if needed and/or desired. The rotational information INF can include a force applied to the rotational device 10 instead of or in addition to the deformation amount of the rotational device 10 if needed and/or desired. The force sensor 32 can be configured to obtain the force applied to the rotational device 10 instead of or in addition to the deformation amount of the rotational device 10 if needed and/or desired.

For example, the force sensor 32 includes a strain gauge 34 and a measurement circuit 36. The strain gauge 34 is attached to the crank arm 14. The strain gauge 34 is configured to output a change in electrical resistance depending on the deformation amount of the rotational device 10. The strain gauge 34 is configured to output the change in the electrical resistance depending on the deformation amount of the crank arm 14. The measurement circuit 36 is electrically connected to the strain gauge 34 to convert the output of the strain gauge 34 to a voltage indicating the deformation amount of the rotational device 10 (e.g., the crank arm 14). For example, the measurement circuit 36 include a bridge circuit with the strain gauge 34.

The measurement circuit 36 is electrically connected to the electronic controller EC1. The measurement circuit 36 is electrically mounted on the circuit board 30C of the electronic controller EC1. For example, the measurement circuit 36 is electrically connected to strain gauge 34 via the circuit board 30C and an additional circuit board such as a flexible printed circuit. The electronic controller EC1 is electrically connected to the measurement circuit 36 to receive the rotational information INF from the measurement circuit 36. The electronic controller EC1 is electrically connected to the measurement circuit 36 to receive the deformation amount of the rotational device 10 (e.g., the crank arm 14) from the measurement circuit 36.

Figure 3:
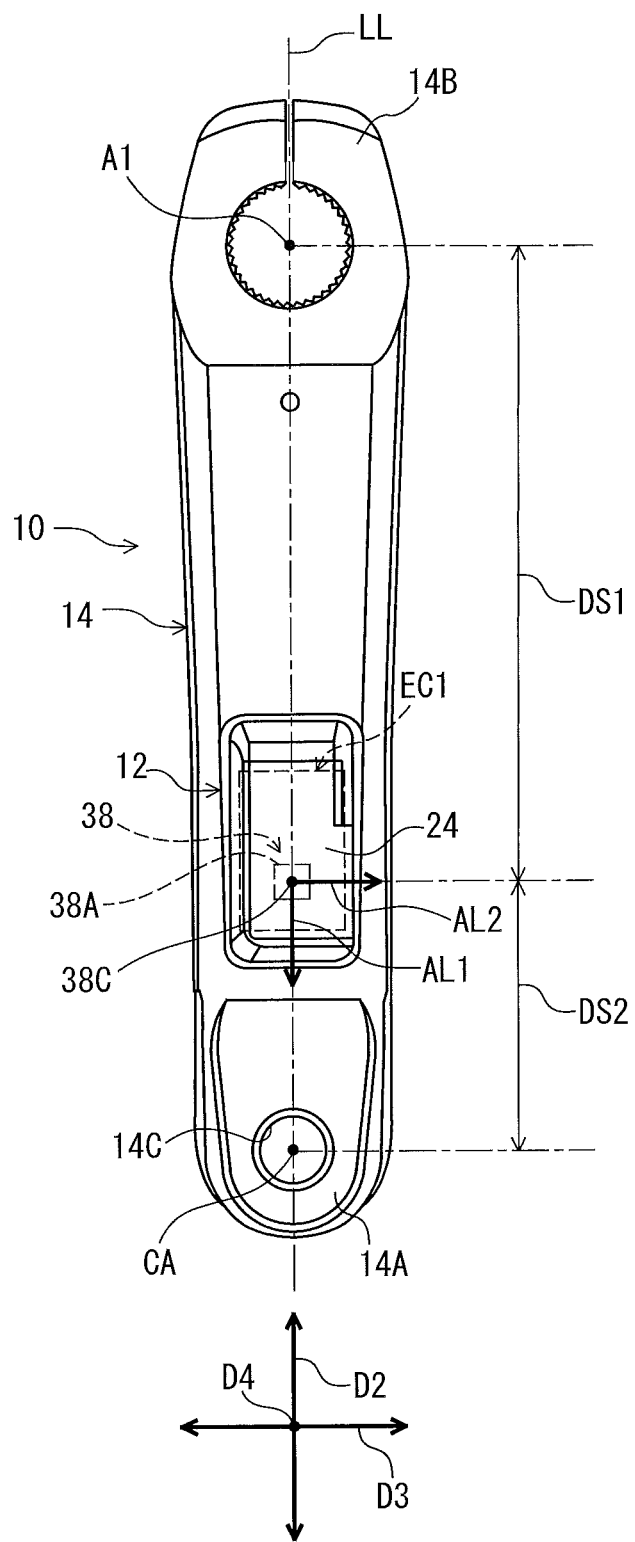
FIG. 3 is a side-elevational view of a part of the rotational device illustrated in FIG. 1.

As seen in FIG. 3, the electrical device 12 further comprises a position sensor 38. The position sensor 38 is configured to sense the rotational position of the rotational device 10. The position sensor 38 is configured to sense the rotational position of the rotational device 10 about the rotational axis A1. The position sensor 38 is configured to sense the inclination angle of the crank arm 14 about the rotational axis A1.

In the present embodiment, the position sensor 38 includes an accelerometer 38A. The accelerometer 38A is configured to sense acceleration applied to the electric device 12. Namely, the accelerometer 38A is configured to sense vibration applied to the electric device 12.

The accelerometer 38A is configured to sense radial acceleration AL1 defined in a radial direction D2 with respect to the rotational axis A1 of the rotational device 10. The accelerometer 38A is configured to sense rotational acceleration AL2 defined in a rotational direction D3 with respect to the rotational axis A1. The accelerometer 38A is configured to sense axial acceleration AL3 defined an axial direction D4 parallel to the rotational axis A1 of the rotational device 10.

The electronic controller EC1 is configured to receive the radial acceleration AL1, the rotational acceleration AL2, and the axial acceleration AL3 from the position sensor 38. The electronic controller EC1 is configured to calculate a rotational position of the rotational device 10 based on the radial acceleration AL1 and the rotational acceleration AL2.

In the present embodiment, the accelerometer 38A include a triaxial accelerometer. However, the accelerometer 38A can include a dual-axis accelerometer if needed and/or desired. The position sensor 38 can include other sensors such as a gyro meter or a magnetic sensor (e.g., a magnetic body and a hall sensor) instead of or in addition to the accelerometer 38A if needed and/or desired.

The electronic controller EC1 is configured to count the number of revolutions of the rotational device 10 per unit time based on the rotational position detected by the position sensor 38. Namely, the electronic controller EC1 is configured to obtain a rotational speed (e.g., a cadence) of the rotational device 10 based on the rotational position detected by the position sensor 38. However, the electrical device 12 can include a cadence sensor which is a separate sensor from the position sensor 38 if needed and/or desired. In such embodiments, the cadence sensor includes a detection object and a detector. The detection object is provided to one of the vehicle body 2A (see e.g., FIG. 1) and the rotational device 10. The detector is provided to the other of the vehicle body 2A and the rotational device 10. The detector is configured to sense the detection object.

As seen in FIG. 3, a longitudinal line LL is defined to intersect with the rotational axis A1 of the rotational device 10 and a center axis CA of the pedal attachment hole 14C of the rotational device 10. The longitudinal line LL is defined perpendicularly to the rotational axis A1 and the center axis CA.

In the present embodiment, the position sensor 38 is provided on the longitudinal line LL. The position sensor 38 is provided on the longitudinal line LL as viewed along the rotational axis A1. A center 38C of the position sensor 38 is provided on the longitudinal line LL as viewed along the rotational axis A1. The radial direction D2 of the accelerometer 38A is parallel to the longitudinal line LL. The rotational direction D3 of the accelerometer 38A is perpendicular to the longitudinal line LL as viewed along the rotational axis A1.

However, the position sensor 38 can be offset from the longitudinal line LL as viewed along the rotational axis A1 if needed and/or desired. The center 38C of the position sensor 38 can be offset from the longitudinal line LL as viewed along the rotational axis A1 if needed and/or desired.

A first distance DS1 is defined from a center 38C of the position sensor 38 to the rotational axis A1. A second distance DS2 is defined from the center 38C of the position sensor 38 to the rotational axis A1. In the present embodiment, the first distance DS1 is different from the second distance DS2. The first distance DS1 is longer than the second distance DS2. However, the first distance DS1 can be shorter than or equal to the second distance DS2 if needed and/or desired.

The electrical device 12 includes a light emitter LE. The light emitter LE is configured to emit light to indicate a state of the rotational device 10. The electronic controller EC1 is electrically connected to the light emitter LE to control the light emitter LE based on the state of the rotational device 10. For example, the state of the rotational device 10 includes at least one of a communication state of the wireless communicator WC1, a pairing state of the wireless communicator WC1, a level of charge of the electric power source 42, and a charging operation of the electric power source 42.

As seen in FIG. 2, the electrical device 12 of the rotational device 10 for the human-powered vehicle 2 comprises an electric power source 42. The electrical device 12 includes a power-source holder 44. The electric power source 42 is electrically connected to the wireless communicator WC1, the electronic controller EC1, the light emitter LE, the force sensor 32, and the position sensor 38 to supply electricity to the wireless communicator WC1, the electronic controller EC1, the light emitter LE, the force sensor 32, and the position sensor 38. The power-source holder 44 is electrically connected to the wireless communicator WC1, the electronic controller EC1, the light emitter LE, the force sensor 32, and the position sensor 38 to supply electricity from the electric power source 42 to the wireless communicator WC1, the electronic controller EC1, the light emitter LE, the force sensor 32, and the position sensor 38. The power-source holder 44 is configured to detachably hold the electric power source 42. The electric power source 42 is rechargeable. Examples of the electric power source 42 include a battery (e.g., a primary battery, a secondary battery).

The electrical device 12 of the rotational device 10 for the human-powered vehicle 2 comprises an electric component CP. The electric component CP is configured to be powered by the electric power source 42. In the present embodiment, the electric component CP includes the wireless communicator WC1. The electric component CP includes a light emitter LE. The electric component CP includes the force sensor 32 and the position sensor 38. The wireless communicator WC1 is configured to be powered by the electric power source 42. The light emitter LE is configured to be powered by the electric power source 42. Thee force sensor 32 and the position sensor 38 are configured to be powered by the electric power source 42.

The electronic controller EC1 is configured to calculate the rotational information INF1 based on the deformation amount of the rotational device 10 (e.g., the crank arm 14) obtained by the force sensor 32. The electronic controller EC1 is configured to calculate the force (e.g., torque) applied to the rotational device 10 based on the deformation amount of the rotational device 10 (e.g., the crank arm 14) obtained by the force sensor 32. For example, the electronic controller EC1 is configured to calculate, as the rotational information INF1, power INF11 applied to the rotational device 10 based on the torque applied to the rotational device 10 (e.g., the crank arm 14) and a rotational speed INF12 of the rotational device 10. However, the electronic controller EC1 can be configured to calculate the power INF11 applied to the rotational device 10 based on other data such as a force applied to the rotational device 10 and a rotational speed of the rotational device 10 if needed and/or desired. For example, the electronic controller EC1 can be configured to calculate an average of the power INF11 during one revolution of the crank arm 14. For example, the electronic controller EC1 can be configured to calculate total power during one revolution of the crank assembly 13 by doubling the power INF11 on the only one crank arm.

The electronic controller EC1 is configured to control the wireless communicator WC1 to wirelessly transmit the rotational information INF obtained by the force sensor 32. The electronic controller EC1 is configured to control the wireless communicator WC1 to wirelessly transmit, as the rotational information INF1, the power INF11 calculated by the electronic controller EC1 based on the force detected by the force sensor 32. The electronic controller EC1 is configured to control the wireless communicator WC1 to wirelessly transmit the rotational speed INF12 calculated by the electronic controller EC1.

The electrical device 12 for the human-powered vehicle 2 comprises a connector port 45 to which the electric cable 31 is detachably connected. The connector port 45 is electrically connected to the electronic controller EC1. The connector port 45 is detachably connectable with a cable connector of the electric cable 31. In a case where the electric power source 42 includes a secondary battery, the electric power source 42 can be charged via the connector port 45. In such embodiments, the electrical device 12 includes a voltage controller configured to control electricity supplied from an electric power supply via the connector port 45. The electronic controller EC1 can be configured to communicate with another electrical device via the connector port 45 and the electric cable 31 for maintenance such as updating software if needed and/or desired.

As seen in FIG. 2, the electrical device 12 is configured to communicate with the additional electrical device 6. The additional electrical device 6 is configured to wirelessly receive the rotational information INF from the electrical device 12. The additional electrical device 6 is configured to wirelessly transmit a signal SG to the electrical device 12 at predetermined intervals. The electrical device 12 is configured to recognize that the wireless communication is normal between the electrical device 12 and the additional electrical device 6 based on the signal SG. Examples of the additional electrical device 6 include a cyclocomputer, a smartphone, and a tablet computer.

The additional electrical device 6 includes the additional wireless communicator WC2, an additional electronic controller EC2, a display 46, and a user interface 48. The additional electronic controller EC2 is electrically connected to the additional wireless communicator WC2, the display 46, and the user interface 48 to control the additional wireless communicator WC2, the display 46, and the user interface 48.

The additional wireless communicator WC2 is configured to wirelessly receive the rotational information INF from the wireless communicator WC1. The additional electronic controller EC2 is electrically connected to the additional wireless communicator WC2 to receive the rotational information INF (e.g., the power INF11, the rotational speed INF12) wirelessly received by the additional wireless communicator WC2.

The additional electronic controller EC2 includes a hardware processor 50P, a hardware memory 50M, and a circuit board 50C, and a bus 50D. The hardware processor 50P is coupled to the hardware memory 50M. The hardware memory 50M is coupled to the hardware processor 50P. The hardware processor 50P and the hardware memory 50M are electrically mounted on the circuit board 50C. The hardware processor 50P is electrically connected to the hardware memory 50M via the circuit board 50C and the bus 50D. The hardware memory 50M is electrically connected to the hardware processor 50P via the circuit board 50C and the bus 50D. The bus 50D is provided on the circuit board 50C. For example, the electronic controller EC2 includes a semiconductor. The hardware processor 50P includes a semiconductor. The hardware memory 50M includes a semiconductor.

For example, the hardware processor 50P includes at least one of a CPU, a MPU, and a memory controller. The hardware memory 50M is electrically connected to the hardware processor 50P. For example, the hardware memory 50M includes at least one of a volatile memory and a non-volatile memory. Examples of the volatile memory include a RAM and a DRAM. Examples of the non-volatile memory include a ROM, an EEPROM, and an HDD. The hardware memory 50M includes storage areas each having an address. The hardware processor 50P is configured to control the hardware memory 50M to store data in the storage areas of the hardware memory 50M and reads data from the storage areas of the hardware memory 50M. The hardware memory 50M can also be referred to as a computer-readable storage medium 50M.

The additional electronic controller EC2 is programed to execute at least one control algorithm of the additional electrical device 6. The hardware memory 50M (e.g., the ROM) stores at least one program including at least one program instruction. The at least one program is read into the hardware processor 50P, and thereby the at least one control algorithm of the additional electrical device 6 is executed based on the at least one program. The additional electronic controller EC2 can also be referred to as an electronic controller circuit or circuitry EC2. The additional electronic controller EC2 can also be referred to as an additional hardware electronic controller EC2.

The structure of the additional electronic controller EC2 is not limited to the above structure. The structure of the additional electronic controller EC2 is not limited to the hardware processor 50P, the hardware memory 50M, and the bus 50D. The additional electronic controller EC2 can be realized by hardware alone or a combination of hardware and software. The hardware processor 50P and the hardware memory 50M can be integrated as a one chip such as an ASIC or a FPGA.

As seen in FIG. 2, the additional wireless communicator WC2 is electrically connected to the hardware processor 50P and the hardware memory 50M with the circuit board 50C and the bus 50D. The additional wireless communicator WC2 is electrically mounted on the circuit board. The additional wireless communicator WC2 includes a signal transmitting circuit or circuitry, a signal receiving circuit or circuitry, and an antenna. Thus, the additional wireless communicator WC2 can also be referred to as an additional wireless communicator circuit or circuitry WC2.

The additional wireless communicator WC2 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the additional wireless communicator WC2 is configured to encrypt signals using a cryptographic key to generate encrypted wireless signals. The additional wireless communicator WC2 is configured to transmit wireless signals via the antenna. The additional wireless communicator WC2 can be a one-way wireless communication device such as a receiver, or a two-way wireless communication device such as a transceiver.

The additional wireless communicator WC2 is configured to receive wireless signals via the antenna. In the present embodiment, the additional wireless communicator WC2 is configured to decode the wireless signals to recognize signals transmitted from other additional wireless communicators. The additional wireless communicator WC2 is configured to decrypt the wireless signals using the cryptographic key.

The display 46 is configured to display the rotational information INF (e.g., the power INF11, the rotational speed INF12) wirelessly transmitted from the wireless communicator WC1 of the electrical device 12. The additional electronic controller EC2 is configured to control the display 46 to display the rotational information INF (e.g., the power INF11, the rotational speed INF12).

The user interface 48 is configured to receive a user input. Examples of the user interface 48 include a mouse, a keyboard, and a touch panel. The additional electronic controller EC2 is configured to receive the user input via the user interface 48.

The additional electrical device 6 includes an electric power source 52 and a power-source holder 54. The electric power source 52 is electrically connected to the additional wireless communicator WC2, the additional electronic controller EC2, the display 46, and the user interface 48 to supply electricity to the additional wireless communicator WC2, the additional electronic controller EC2, the display 46, and the user interface 48. The power-source holder 54 is electrically connected to the additional wireless communicator WC2, the additional electronic controller EC2, the display 46, and the user interface 48 to supply electricity from the electric power source 52 to the additional wireless communicator WC2, the additional electronic controller EC2, the display 46, and the user interface 48. The power-source holder 54 is configured to detachably hold the electric power source 52. Examples of the electric power source 52 include a battery (e.g., a primary battery, a secondary battery).

As seen in FIG. 2, the electrical device 12 is configured to communicate with the external electrical device 8. The external electrical device 8 is configured to receive input information INF2 from the user. The electronic controller EC1 is configured to receive the input information INF2 from the external electrical device 8. Examples of the external electrical device 8 include a cyclocomputer, a smartphone, a tablet computer, and a personal computer. For example, the input information INF2 includes an input rotational position INF21 of the rotational device 10, an input rotational range INF22 of the rotational device 10, identification information INF23 of the rotational device 10, and identification information INF24 of the human-powered vehicle 2. The identification information INF23 of the rotational device 10 includes at least one of a manufacture name, a model name, and a model number of the rotational device 10. The identification information INF24 of the human-powered vehicle 2 includes at least one of a manufacture name, a model name, and a model number of the human-powered vehicle 2.

The external electrical device 8 includes an external wireless communicator WC3, an external electronic controller EC3, a display 56, and a user interface 58. The external electronic controller EC3 is electrically connected to the external wireless communicator WC3, the display 56, and the user interface 58 to control the external wireless communicator WC3, the display 56, and the user interface 58.

The external electronic controller EC3 includes a hardware processor 60P, a hardware memory 60M, and a circuit board 60C, and a bus 60D. The hardware processor 60P is coupled to the hardware memory 60M. The hardware memory 60M is coupled to the hardware processor 60P. The hardware processor 60P and the hardware memory 60M are electrically mounted on the circuit board 60C. The hardware processor 60P is electrically connected to the hardware memory 60M via the circuit board 60C and the bus 60D. The hardware memory 60M is electrically connected to the hardware processor 60P via the circuit board 60C and the bus 60D. The bus 60D is provided on the circuit board 60C. For example, the external electronic controller EC3 includes a semiconductor. The hardware processor 60P includes a semiconductor. The hardware memory 60M includes a semiconductor.

For example, the hardware processor 60P includes at least one of a CPU, a MPU, and a memory controller. The hardware memory 60M is electrically connected to the hardware processor 60P. For example, the hardware memory 60M includes at least one of a volatile memory and a non-volatile memory. Examples of the volatile memory include a RAM and a DRAM. Examples of the non-volatile memory include a ROM, an EEPROM, and an HDD. The hardware memory 60M includes storage areas each having an address. The hardware processor 60P is configured to control the hardware memory 60M to store data in the storage areas of the hardware memory 60M and reads data from the storage areas of the hardware memory 60M. The hardware memory 60M can also be referred to as a computer-readable storage medium 60M.

The external electronic controller EC3 is programmed to execute at least one control algorithm of the additional electrical device 6. The hardware memory 60M (e.g., the ROM) stores at least one program including at least one program instruction. The at least one program is read into the hardware processor 60P, and thereby the at least one control algorithm of the additional electrical device 6 is executed based on the at least one program. The external electronic controller EC3 can also be referred to as an electronic controller circuit or circuitry EC3. The external electronic controller EC3 can also be referred to as an external hardware electronic controller EC3.

The structure of the external electronic controller EC3 is not limited to the above structure. The structure of the external electronic controller EC3 is not limited to the hardware processor 60P, the hardware memory 60M, and the bus 60D. The external electronic controller EC3 can be realized by hardware alone or a combination of hardware and software. The hardware processor 60P and the hardware memory 60M can be integrated as a one chip such as an ASIC or a FPGA.

The external wireless communicator WC3 is configured to wirelessly communicate with another wireless communicator such as the wireless communicator WC1 and the additional wireless communicator WC2.

As seen in FIG. 2, the external wireless communicator WC3 is electrically connected to the hardware processor 60P and the hardware memory 60M with the circuit board 60C and the bus 60D. The external wireless communicator WC3 is electrically mounted on the circuit board. The external wireless communicator WC3 includes a signal transmitting circuit or circuitry, a signal receiving circuit or circuitry, and an antenna. Thus, the external wireless communicator WC3 can also be referred to as an external wireless communicator WC3 circuit or circuitry 22.

The external wireless communicator WC3 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the external wireless communicator WC3 is configured to encrypt signals using a cryptographic key to generate encrypted wireless signals. The external wireless communicator WC3 is configured to transmit wireless signals via the antenna. The wireless communicator WC3 can be a one-way wireless communication device such as a receiver, or a two-way wireless communication device such as a transceiver.

The external wireless communicator WC3 is configured to receive wireless signals via the antenna. In the present embodiment, the external wireless communicator WC3 is configured to decode the wireless signals to recognize signals transmitted from other external wireless communicators. The external wireless communicator WC3 is configured to decrypt the wireless signals using the cryptographic key.

The display 56 is configured to display information relating to the human-powered vehicle 2. The external electronic controller EC3 is configured to control the display 56 to display the information relating to the human-powered vehicle 2. For example, the information relating to the human-powered vehicle 2 includes the rotational information INF1 and the settings of the rotational device 10.

The user interface 58 is configured to receive a user input. Examples of the user interface 58 include a mouse, a keyboard, and a touch panel. The external electronic controller EC3 is configured to receive the user input via the user interface 58. The external electronic controller EC3 is configured to receive the input information INF2 via the user interface 58.

The external electrical device 8 includes an external electric power source 62 and a power-source holder 64. The external electric power source 62 is electrically connected to the external wireless communicator WC3, the external electronic controller EC3, the display 56, and the user interface 58 to supply electricity to the external wireless communicator WC3, the external electronic controller EC3, the display 56, and the user interface 58. The power-source holder 64 is electrically connected to the external wireless communicator WC3, the external electronic controller EC3, the display 56, and the user interface 58 to supply electricity from the external electric power source 62 to the external wireless communicator WC3, the external electronic controller EC3, the display 56, and the user interface 58. The power-source holder 64 is configured to detachably hold the external electric power source 62. Examples of the external electric power source 62 include a battery (e.g., a primary battery, a secondary battery).

The electronic controller EC1 is configured to control the wireless communicator WC1 to wirelessly transmit the rotational information INF at predetermined intervals. The electronic controller EC1 is configured to control the wireless communicator WC1 to wirelessly transmit the rotational information INF using wireless signals at the predetermined intervals. The electronic controller EC1 is configured to control the wireless communicator WC1 to wirelessly transmit the power INF11 and the rotational speed INF12 using the wireless signals WS at the predetermined intervals. In FIG. 3, the rotational speed INF12 of the rotational device 10 is illustrated to be constant for sake of brevity.

The additional wireless communicator WC2 of the additional electrical device 6 is configured to wirelessly receive the rotational information INF transmitted from the wireless communicator WC1 of the electrical device 12 at the predetermined intervals. The additional wireless communicator WC2 of the additional electrical device 6 is configured to wirelessly receive the power INF11 and the rotational speed INF12 transmitted from the wireless communicator WC1 of the electrical device 12 at the predetermined intervals.

The additional electronic controller EC2 of the additional electrical device 6 is configured to control the display 46 to display the rotational information INF wirelessly received by the additional wireless communicator WC2 at the predetermined intervals. The additional electronic controller EC2 is configured to control the display 46 to display the power INF11 and the rotational speed INF12 wirelessly received by the additional wireless communicator WC2 at the predetermined intervals. The additional electronic controller EC2 is configured to control the display 46 to display the latest values of the power INF11 and the rotational speed INF12. Thus, the user can recognize the power INF11 and the rotational speed INF12 of the rotational device 10 via the display 46 of the additional electrical device 6 during pedaling.

The external electrical device 8 includes an external communicator circuit WD3. The external communicator circuit WD3 is configured to communicate with another wired communicator of another electric device (e.g., the communicator circuit WD1 of the electrical device 12) via the electric cable 31. For example, the electronic controller EC1 is electrically connected to the connector port 45 to communicate with the external electrical device 8 via the connector port 45 and the electric cable 31. The external communicator circuit WD3 is configured to communicate with the external electrical device 8 via the electric cable 31 using the PLC technology. The external communicator circuit WD3 has substantially the same structure as the structure of the communicator circuit WD1. Thus, it will not be described in detail here for the sake of brevity. The external communicator circuit WD3 can also be referred to as an external wired communicator WD3.

The external electric power source 62 is configured to supply electricity to the electrical device 12 via the electric cable 31 in a state where the external electrical device 8 is connected to the electrical device 12 via the electric cable 31. The electric power source 42 can be charged with electricity supplied from the external electric power source 62 via the connector port 45. Thus, the external electric power source 62 can also be referred to as a charging power source 62. However, the charging power source can include a power source other than the external electric power source 62 if needed and/or desired.

Figure 4:
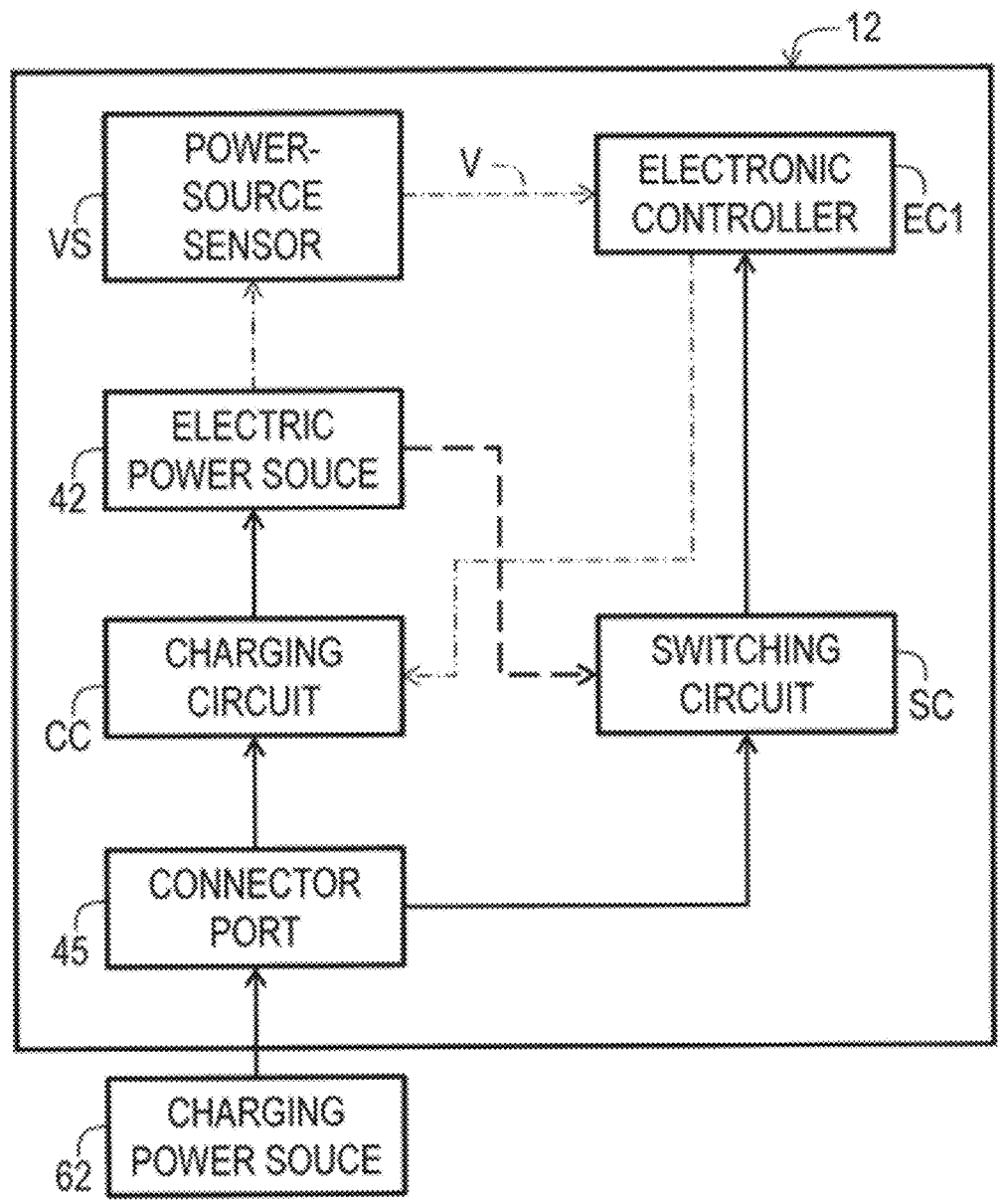
FIG. 4 is a schematic block diagram of the rotational device illustrated in FIG. 1 in a case where an electric power source is charged by a charting power source.

As seen in FIG. 4, the electrical device 12 of the rotational device 10 for the human-powered vehicle 2 comprises the connector port 45 to which the charging power source 62 is electrically connected. The electric power source 42 is electrically connected to the connector port 45.

The electronic controller EC1 is configured to control supply of electricity from the charging power source 62 to the electric power source 42 via the connector port 45. The electronic controller EC1 is configured to be powered by the charging power source 62 in a state where electricity is supplied from the charging power source 62 to the electric power source 42 via the connector port 45.

For example, the electrical device 12 includes a charging circuit CC. The charging circuit CC is electrically connected to the electric power source 42 and the connector port 45 to charge the external power source PSI using electricity supplied from the charging power source 62 via the connector port 45. For example, the charging circuit CC includes at least one of a transistor and a voltage regulator.

The electrical device 12 of the rotational device 10 for the human-powered vehicle 2 comprises a power-source sensor VS. The power-source sensor VS is configured to sense an output voltage V of the electric power source 42. The electronic controller EC1 is electrically connected to the power-source sensor VS to obtain the output voltage V sensed by the power-source sensor VS.

The electronic controller EC1 is electrically connected to the charging circuit CC to control charging circuit CC depending on the output voltage V sensed by the power-source sensor VS. The electronic controller EC1 transmits a changing control signal to the charging circuit CC in a case where the output voltage V sensed by the power-source sensor VS is lower than a charging threshold. The charging circuit CC charges the electric power source 42 using the charging power source 62 in response to the charging control signal. The electronic controller EC1 transmits a changing control signal to the charging circuit CC in a case where the output voltage V sensed by the power-source sensor VS is higher than or equal to the charging threshold.

The electrical device 12 includes a switching circuit SC. The switching circuit SC is electrically connected to the electric power source 42, the connector port 45, and the electronic controller EC1 to change power supply between the electric power source 42 and the charging power source 62. The switching circuit SC supplies electricity from one of the electric power source 42 and the charging power source 62 to the electronic controller EC1. For example, the switching circuit SC includes a diode.

The electronic controller EC1 is configured to be powered by the charging power source 62 without being powered by the electric power source 42 in a state where electricity is supplied from the charging power source 62 to the connector port 45. For example, the switching circuit SC supplies electricity from the charging power source 62 to the electronic controller EC1 and blocks electricity from the electric power source 42 in the state where electricity is supplied from the charging power source 62 to the connector port 45.

Figure 5:
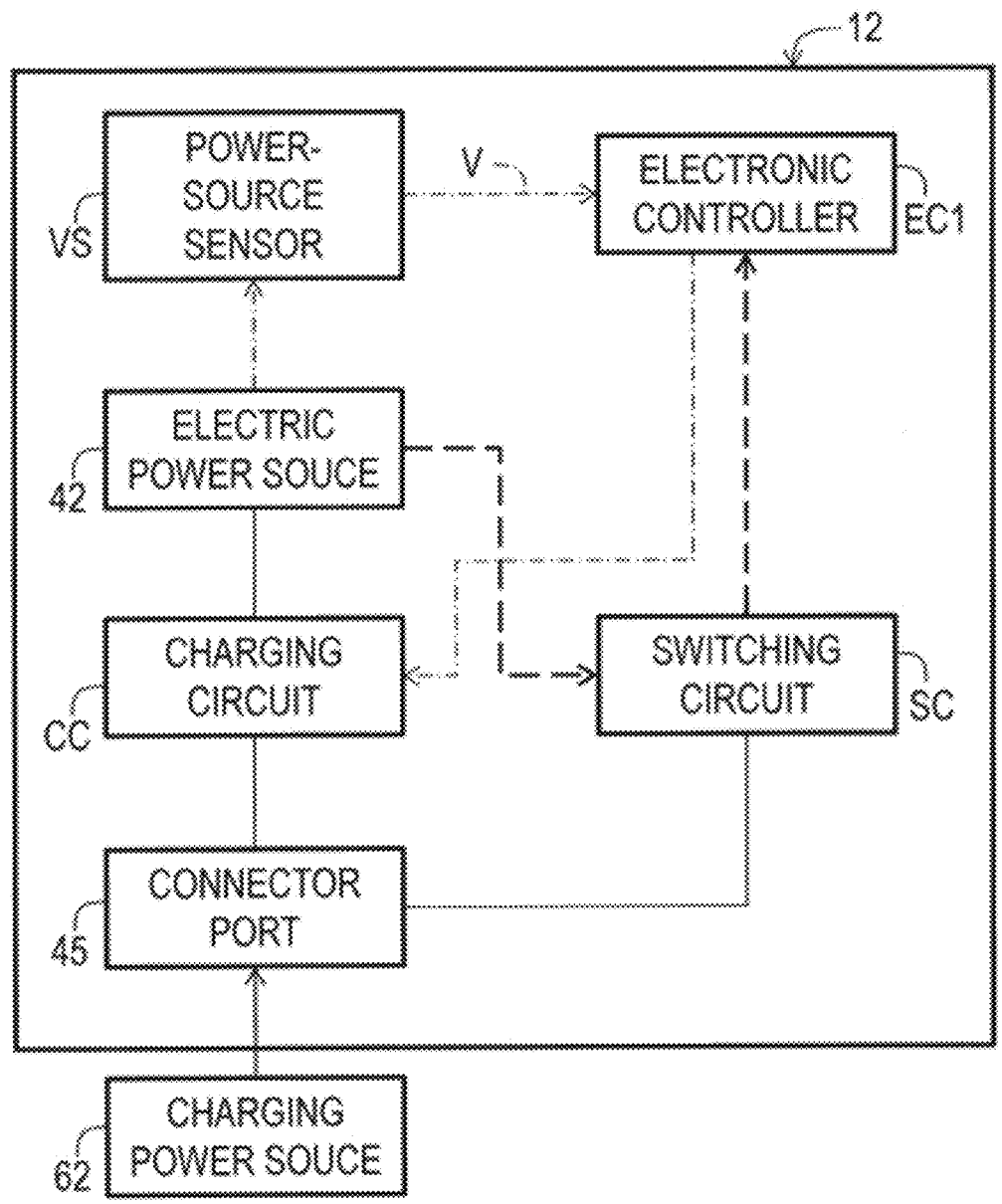
FIG. 5 is a schematic block diagram of the rotational device illustrated in FIG. 1 in a case where the electric power source is not charged by the charting power source.

As seen in FIG. 5, the electronic controller EC1 is configured to be powered by the electric power source 42 in a state where electricity is not supplied from the charging power source 62 to the connector port 45. The electronic controller EC1 is configured to be powered by the electric power source 42 in a state where the charging power source 62 is not connected to the connector port 45. For example, the switching circuit SC supplies electricity from the electric power source 42 to the electronic controller EC1 in the state where electricity is not supplied from the charging power source 62 to the connector port 45. The switching circuit SC supplies electricity from the electric power source 42 to the electronic controller EC1 in the state where the charging power source 62 is not connected to the connector port 45.

Figure 6:
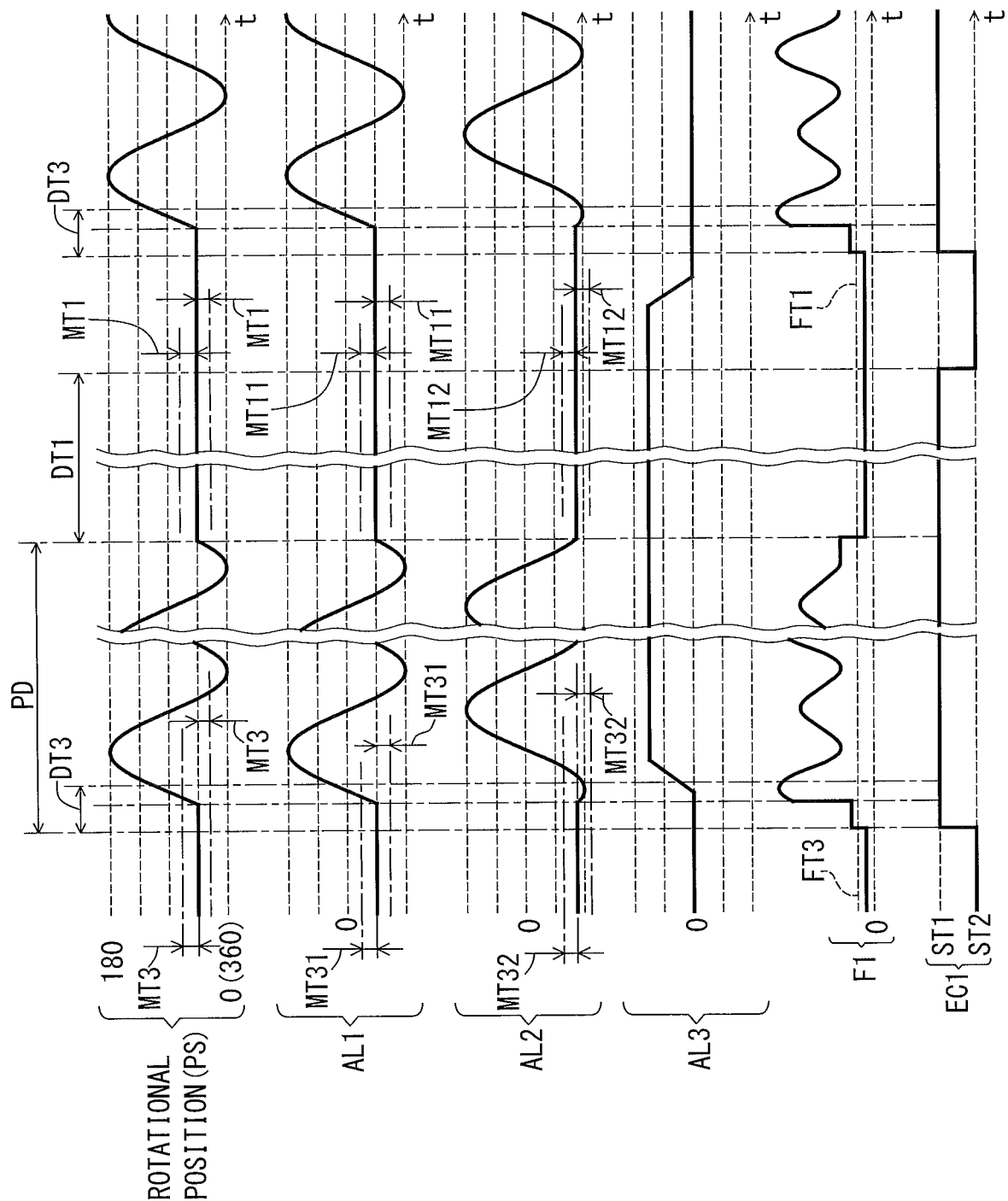
FIGS. 6 to 11 are timing charts showing control of an electrical device of the rotational device illustrated in FIG. 1.

As seen in FIG. 6, the electronic controller EC1 is configured to operate with first power consumption in a first state ST1 and is configured to operate with second power consumption lower than the first power consumption in a second state ST2. The first state ST1 can also be referred to as a wake mode. The second state ST2 can also be referred to as a sleep mode. For example, when the accelerometer 38A senses the rotational position PS of the rotational device 10 is changed in the second state ST2, the electronic controller EC1 changes the state of the electrical device 12 from the second state ST2 to the first state ST1. When an amount of change in acceleration sensed by the accelerometer 38A is equal to or greater than a threshold in the second state ST2, the electronic controller EC1 changes the state of the electrical device 12 from the second state ST2 to the first state ST1. When the force F1 sensed by the force sensor 32 is equal to or greater than a threshold in the second state ST2, the electronic controller EC1 changes the state of the electrical device 12 from the second state ST2 to the first state ST1.

The electronic controller EC1 includes a power control circuit configured to control electricity supplied to the wireless communicator WC1. The electronic controller EC1 is configured to obtain the rotational position PS of the rotational device 10 in each of the first state ST1 and the second state ST2. The electronic controller EC1 is configured to supply electricity from the electric power source 42 to the wireless communicator WC1 in the first state ST1. The electronic controller EC1 is configured to stop or reduce electricity supplied to the wireless communicator WC1 in the second state ST2. For example, the electronic controller EC1 changes intervals at which the wireless communicator WC1 is responsive to a wireless signal. The electronic controller EC1 shortens the intervals in the first state ST1 and makes the intervals longer in the second state ST2. The wireless communicator WC1 does not transmit wireless signals in the second state ST2. The wireless communicator WC1 does not receive or is less likely to respond wireless signals from the additional electrical device 6 and the external electrical device 8 in the second state ST2.

However, the wireless communicator WC1 can be configured to receive wireless signals from other devices in the second state ST2 if needed and/or desired. In such embodiments, the electronic controller EC1 can be configured to supply electricity to the signal transmitting circuit of the wireless communicator WC1 in response to the wireless signal transmitted from at least one of the additional electrical device 6 and the external electrical device 8 if needed and/or desired.

Furthermore, the electronic controller EC1 can be configured to stop electricity to the electronic controller EC1 and the wireless communicator WC1 in the second state ST2. In such embodiments, the electronic controller EC1 and the wireless communicator WC1 can be configured to be turned on in response to an operation of a switch provided to the electrical device 12, changing the state from the second state ST2 to the first state ST1.

FIG. 6 shows an example of the output of the accelerometer 38A in a case where the binding pedals are used. However, the output of the accelerometer 38A can have other waveforms if needed and/or desired.

As seen in FIG. 6, the electronic controller EC1 is configured to change the state of the electrical device 12 from the second state ST2 to the first state ST1 in a case where a wake condition is met in the second state ST2.

The wake condition includes at least one of that an amount of change in the rotational position PS sensed by the position sensor 38 is greater than a wake movement threshold MT3 and that the force F1 sensed by the force sensor 32 is lower than a wake force threshold FT3. Namely, the electronic controller EC1 is configured to change the state of the electrical device 12 from the second state ST2 to the first state ST1 in a case where the amount of change in the rotational position PS sensed by the position sensor 38 is greater than the wake movement threshold MT3 and where the force F1 sensed by the force sensor 32 is greater than the wake force threshold FT3.

The wake force threshold FT3 includes a radial acceleration threshold MT31 and a rotational acceleration threshold MT32. The wake condition includes at least one of: that an amount of change in the radial acceleration AL1 defined in the radial direction D2 with respect to the rotational axis A1 of the rotational device 10 is greater than the radial acceleration threshold MT31; and that an amount of change in the rotational acceleration AL2 defined in the rotational direction D3 with respect to the rotational axis A1 is greater than the rotational acceleration threshold MT32. The wake condition includes at least one of: that an amount of change in the radial acceleration AL1 is greater than the radial acceleration threshold MT31; that an amount of change in the rotational acceleration AL2 is greater than the rotational acceleration threshold MT32; and that the force F1 is greater than the wake force threshold FT3.

The amount of change in the acceleration sensed by the accelerometer 38A includes vibration sensed by the accelerometer 38A. The amount of change in the radial acceleration AL1 sensed by the accelerometer 38A includes vibration in the radial direction D2. The amount of change in the rotational acceleration AL2 sensed by the accelerometer 38A includes vibration in the rotational direction D3. The amount of change in the axial acceleration AL3 sensed by the accelerometer 38A includes vibration in the axial direction D4. Namely, the wake condition can include vibration sensed by the accelerometer 38A of the position sensor 38.

The electronic controller EC1 is configured to change the state of the electrical device 12 from the second state ST2 to the first state ST1 in at least one of a case where the amount of change in the radial acceleration AL1 is greater than the radial acceleration threshold MT31 and a case where the amount of change in the rotational acceleration AL2 is greater than the rotational acceleration threshold MT32. The electronic controller EC1 is configured to change the state of the electrical device 12 from the second state ST2 to the first state ST1 in at least one of the case where the amount of change in the radial acceleration AL1 is greater than the radial acceleration threshold MT31, the case where the amount of change in the rotational acceleration AL2 is greater than the rotational acceleration threshold MT32, and a case where the force F1 is greater than the wake force threshold FT3.

In the present embodiment, the electronic controller EC1 is configured to change the state of the electrical device 12 from the second state ST2 to the first state ST1 in at least one of a case where the amount of change in the radial acceleration AL1 is greater than or equal to the radial acceleration threshold MT31 and a case where the amount of change in the rotational acceleration AL2 is greater than or equal to the rotational acceleration threshold MT32. The electronic controller EC1 is configured to change the state of the electrical device 12 from the second state ST2 to the first state ST1 in at least one of the case where the amount of change in the radial acceleration AL1 is greater than or equal to the radial acceleration threshold MT31, the case where the amount of change in the rotational acceleration AL2 is greater than or equal to the rotational acceleration threshold MT32, and a case where the force F1 is greater than or equal to the wake force threshold FT3. However, the wake condition is not limited to the above conditions.

Figure 7:
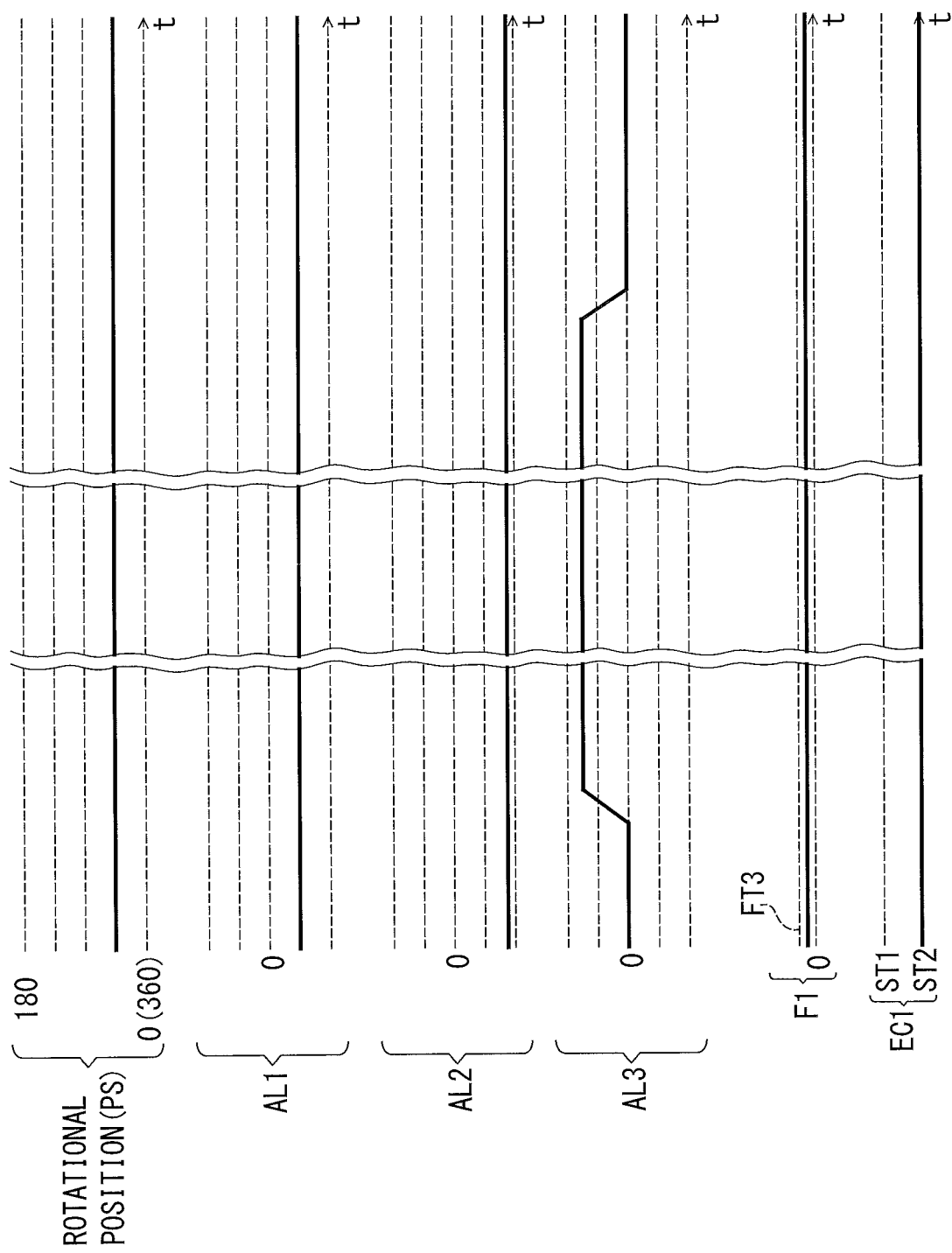

As seen in FIG. 7, the wake condition is free of the axial acceleration AL3 defined the axial direction D4 parallel to the rotational axis A1 of the rotational device 10. The electronic controller EC1 is configured to maintain the second state ST2 in a case where the electronic controller EC1 recognizes that the axial acceleration AL3 changes in the second state ST2. For example, the axial acceleration AL3 changes when the rotational device 10 moves to change an angle of the rotational axis A1 (see e.g., FIG. 1) relative to the vertical direction or when the crank arm 14 is elastically deformed in the axial direction D4 (see e.g., FIG. 1).

As seen in FIG. 6, the electronic controller EC1 is configured to change the state of the electrical device 12 from the first state ST1 to the second state ST2 in a case where a first sleep condition is met for a first sleep determination time DT1 in the first state ST1. The electronic controller EC1 stores the first sleep determination time DT1 in the hardware memory 30M.

The first sleep condition includes that the amount of change in the rotational position PS sensed by the position sensor 38 is less than a first movement threshold MT1 and that the force F1 sensed by the force sensor 32 is lower than a first force threshold FT1. Namely, the electronic controller EC1 is configured to change the state of the electrical device 12 from the first state ST1 to the second state ST2 in a case where the amount of change in the rotational position PS sensed by the position sensor 38 is less than the first movement threshold MT1 and where the force F1 sensed by the force sensor 32 is lower than the first force threshold FT1. The first sleep condition is free of the axial acceleration AL3.

The first movement threshold MT1 includes a first radial acceleration threshold MT11 and a first rotational acceleration threshold MT12. The first sleep condition includes that the amount of change in the radial acceleration AL1 is less than the first radial acceleration threshold MT11 and that the amount of change in the rotational acceleration AL2 is less than the first rotational acceleration threshold MT12. The first sleep condition includes that the amount of change in the radial acceleration AL1 is less than the first radial acceleration threshold MT11, that the amount of change in the rotational acceleration AL2 is less than the first rotational acceleration threshold MT12, and that the force F1 is lower than the first force threshold FT1.

The electronic controller EC1 is configured to change the state of the electrical device 12 from the first state ST1 to the second state ST2 in a case where the amount of change in the radial acceleration AL1 is less than the first radial acceleration threshold MT11 and where the amount of change in the rotational acceleration AL2 is less than the first rotational acceleration threshold MT12. The electronic controller EC1 is configured to change the state of the electrical device 12 from the first state ST1 to the second state ST2 in a case where the amount of change in the radial acceleration AL1 is less than the first radial acceleration threshold MT11, where the amount of change in the rotational acceleration AL2 is less than the first rotational acceleration threshold MT12, and where the force F1 is lower than the first force threshold FT1. However, the first sleep condition is not limited to the above conditions.

As seen in FIG. 6, the electronic controller EC1 is configured to change the state of the electrical device 12 from the first state ST1 to the second state ST2 regardless of the axial acceleration AL3, in a case where the amount of change in the radial acceleration AL1 is less than the first radial acceleration threshold MT11 for the first sleep determination time DT1 and where the amount of change in the rotational acceleration AL2 is less than the first rotational acceleration threshold MT12 for the first sleep determination time DT1.

Figure 8:
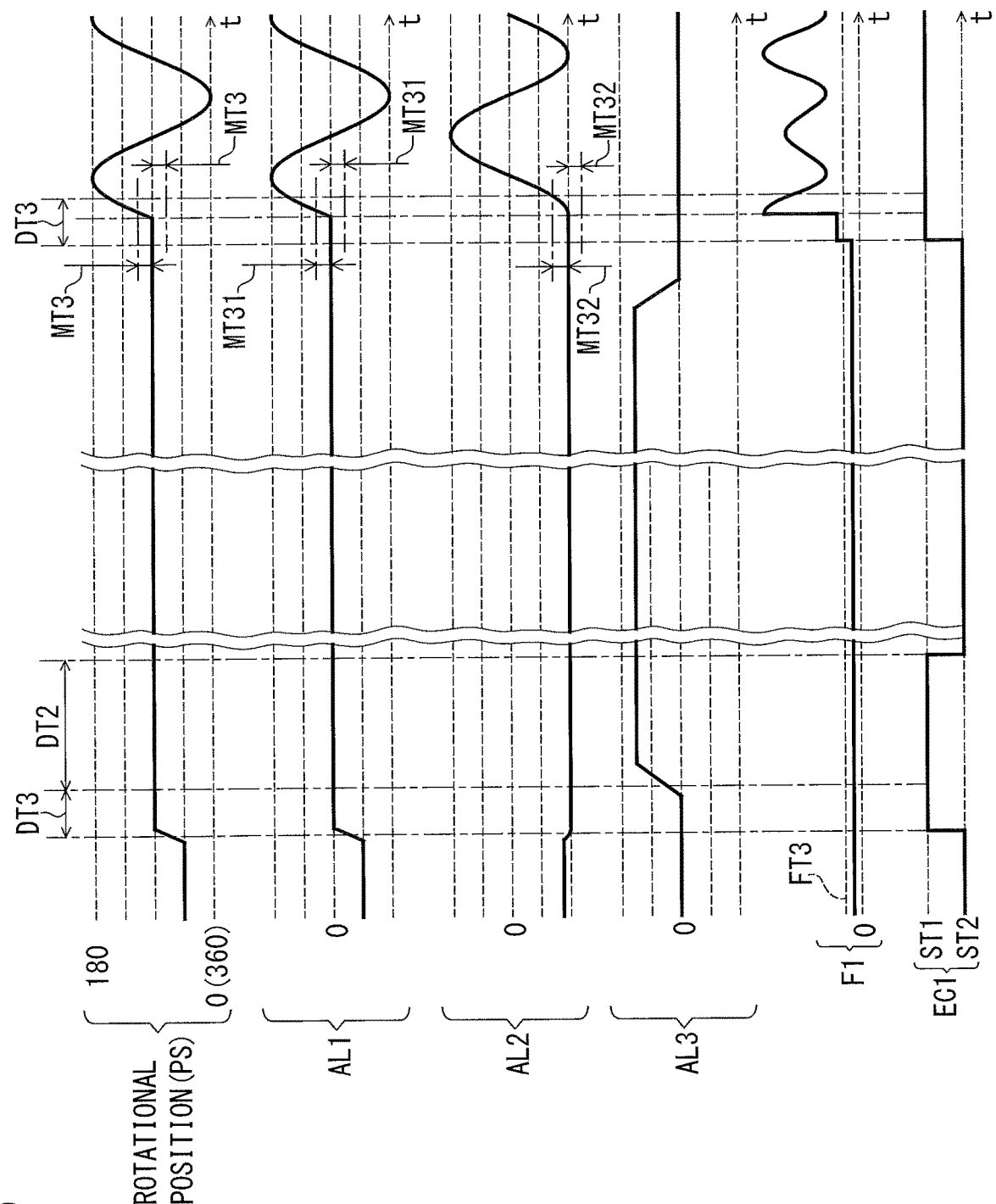

As seen in FIG. 8, the electronic controller EC1 is configured to change the state of the electrical device 12 from the first state ST1 to the second state ST2 in a case where a second sleep condition is met for a second sleep determination time DT2 in the first state ST1.

As seen in FIG. 6, in the present embodiment, the second sleep determination time DT2 is different from the first sleep determination time DT1. The second sleep determination time DT2 is shorter than the first sleep determination time DT1. For example, the first sleep determination time DT1 ranges from 3 minutes to 8 minutes. The first sleep determination time DT1 is 5 minutes. The second sleep determination time DT2 ranges from 5 seconds to 30 seconds. The second sleep determination time DT2 is 10 seconds. However, the second sleep determination time DT2 can be longer than or equal to the first sleep determination time DT1 if needed and/or desired. The first sleep determination time DT1 is not limited to the above range and the above time. The second sleep determination time DT2 is not limited to the above range and the above time.

The electronic controller EC1 stores the first sleep determination time DT1 and the second sleep determination time DT2 in the hardware memory 30M. At least one of the first sleep determination time DT1 and the second sleep determination time DT2 can be set by the user based on the user input received by another device such as the additional electrical device 6 and the external electrical device 8. The electronic controller EC1 can be configured to change the second sleep determination time DT2 depending on the circumstances (e.g., frequency with which the state is changed from the first state ST1 to the second state ST2 based on the second sleep condition).

As seen in FIG. 8, the second sleep condition includes that the amount of change in the rotational position PS sensed by the position sensor 38 is less than a second movement threshold MT2 and that the force F1 sensed by the force sensor 32 is lower than a second force threshold FT2. The electronic controller EC1 is configured to change the state of the electrical device 12 from the first state ST1 to the second state ST2 in a case where the amount of change in the rotational position PS sensed by the position sensor 38 is less than the second movement threshold MT2 and where the force F1 sensed by the force sensor 32 is lower than the second force threshold FT2. The second sleep condition is free of the axial acceleration AL3.

In the present embodiment, the second movement threshold MT2 includes a second radial acceleration threshold MT21 and a second rotational acceleration threshold MT22. The second sleep condition includes that the amount of change in the radial acceleration AL1 is less than the second radial acceleration threshold MT21 and that the amount of change in the rotational acceleration AL2 is less than the second rotational acceleration threshold MT22. The second sleep condition includes that the amount of change in the radial acceleration AL1 is less than the second radial acceleration threshold MT21, that the amount of change in the rotational acceleration AL2 is less than the second rotational acceleration threshold MT22, and that the force F1 sensed by the force sensor 32 is lower than the second force threshold FT2. However, the second sleep condition is not limited to the above conditions.

As seen in FIG. 8, the electronic controller EC1 is configured to change the state of the electrical device 12 from the first state ST1 to the second state ST2 in a case where the second sleep condition is met for the second sleep determination time DT2 after the electronic controller EC1 changes the state of the electrical device 12 from the second state ST2 to the first state ST1.

For example, the electronic controller EC1 is configured to change the state of the electrical device 12 from the first state ST1 to the second state ST2 in a case where the wake condition is no longer met within a third sleep determination time DT3 and the second sleep condition is met for the second sleep determination time DT2 after the electronic controller EC1 changes the state of the electrical device 12 from the second state ST2 to the first state ST1. The electronic controller EC1 is configured to change the state of the electrical device 12 from the first state ST1 to the second state ST2 in a case where the second sleep condition is met for the second sleep determination time DT2 after the wake condition is no longer met within the third sleep determination time DT3. To determine the third sleep determination time DT3, the electronic controller EC1 starts to measure a time from a timing at which the electronic controller EC1 changes the state of the electrical device 12 from the second state ST2 to the first state ST1. To determine the second sleep determination time DT2, the electronic controller EC1 starts to measure a time from a timing at which the wake condition is no longer met.

The electronic controller EC1 is configured to change the state of the electrical device 12 from the first state ST1 to the second state ST2 regardless of the axial acceleration AL3, in a case where the amount of change in the radial acceleration AL1 is less than the second radial acceleration threshold MT21 for the second sleep determination time DT2 and where the amount of change in the rotational acceleration AL2 is less than the second rotational acceleration threshold MT22 for the second sleep determination time DT2.

As seen in FIG. 6, the electronic controller EC1 is configured to maintain the first state ST1 in a case where the wake condition is met for the third sleep determination time DT3 after the electronic controller EC1 changes the state of the electrical device 12 from the second state ST2 to the first state ST1. The electronic controller EC1 does not determine the second sleep condition in a case where the wake condition is met for the third sleep determination time DT3 after the electronic controller EC1 changes the state of the electrical device 12 from the second state ST2 to the first state ST1.

Figure 9:
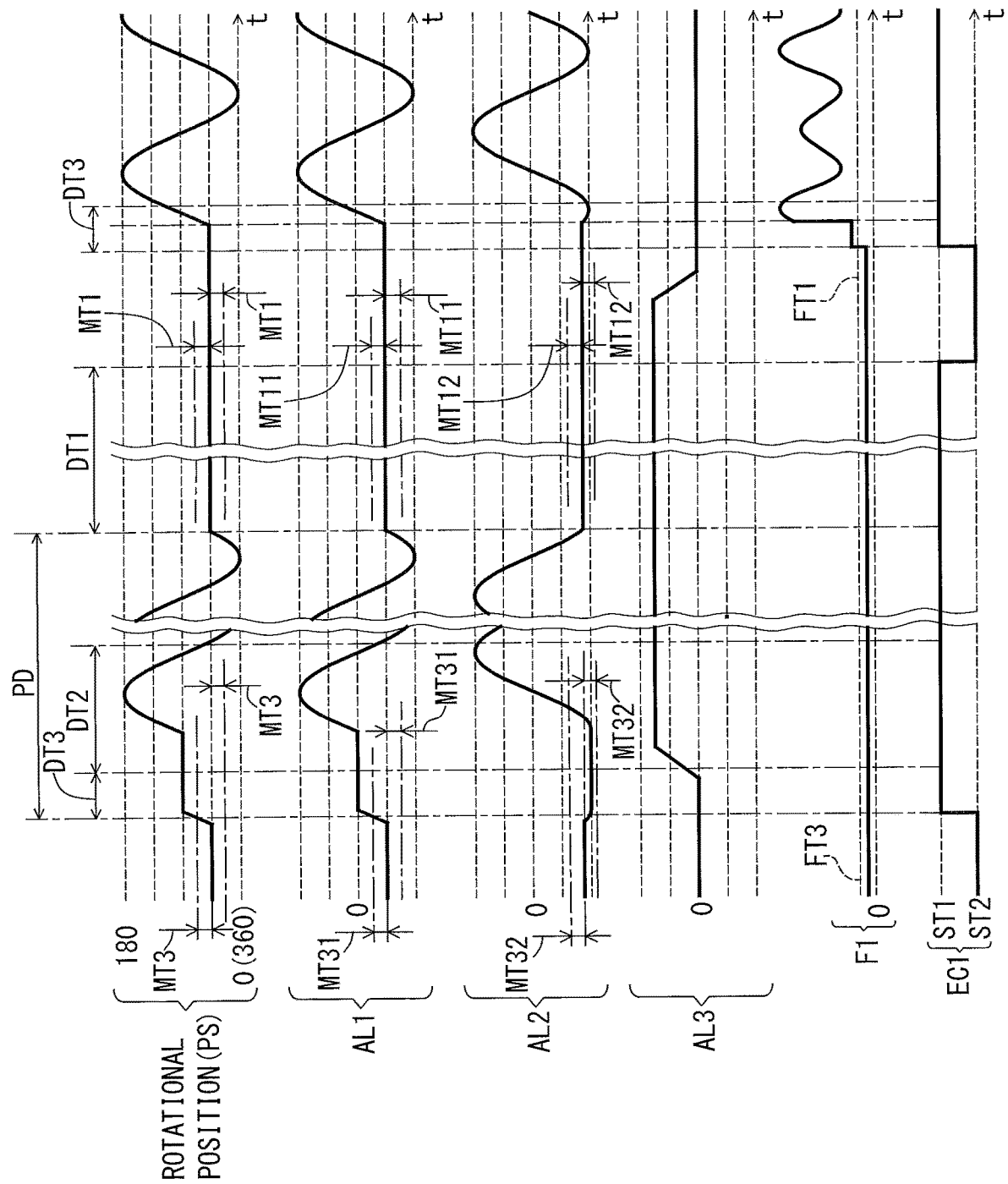

As seen in FIG. 9, the electronic controller EC1 is configured to maintain the first state ST1 in a case where the second sleep condition is not met before the second sleep determination time DT2 elapses after the electronic controller EC1 changes the state of the electrical device 12 from the second state ST2 to the first state ST1. For example, the electronic controller EC1 is configured to maintain the first state ST1 in a case where the second sleep condition is not met before the second sleep determination time DT2 elapses after the wake condition is no longer met within the third sleep determination time DT3.

The electronic controller EC1 is configured to change the state of the electrical device 12 from the first state ST1 to the second state ST2 in a case where the first sleep condition is met for the first sleep determination time DT1 after the second sleep condition is not met. The electronic controller EC1 is configured to change the state of the electrical device 12 from the first state ST1 to the second state ST2 in a case where the first sleep condition is met for the first sleep determination time DT1 after the wake condition is no longer met within the third sleep determination time DT3 and the second sleep condition is not met within the second sleep determination time DT2.

Figure 10:
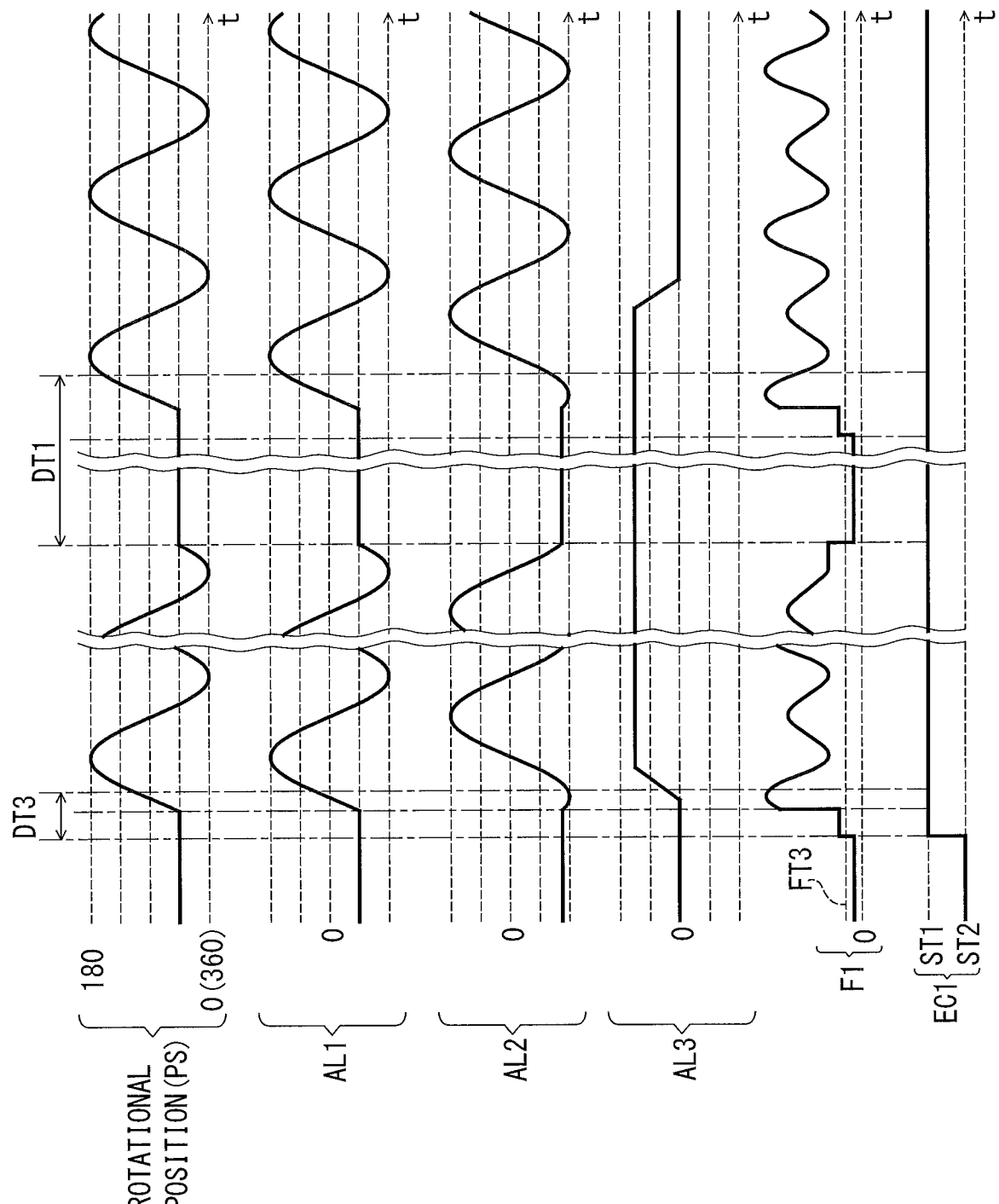

As seen in FIG. 10, the electronic controller EC1 is configured to maintain the first state ST1 in a case where the first sleep condition is not met before the first sleep determination time DT1 elapses after the second sleep condition is not met. To determine the first sleep determination time DT1, the electronic controller EC1 starts to measure a time from a timing at which the first sleep condition is met.

Figure 11:
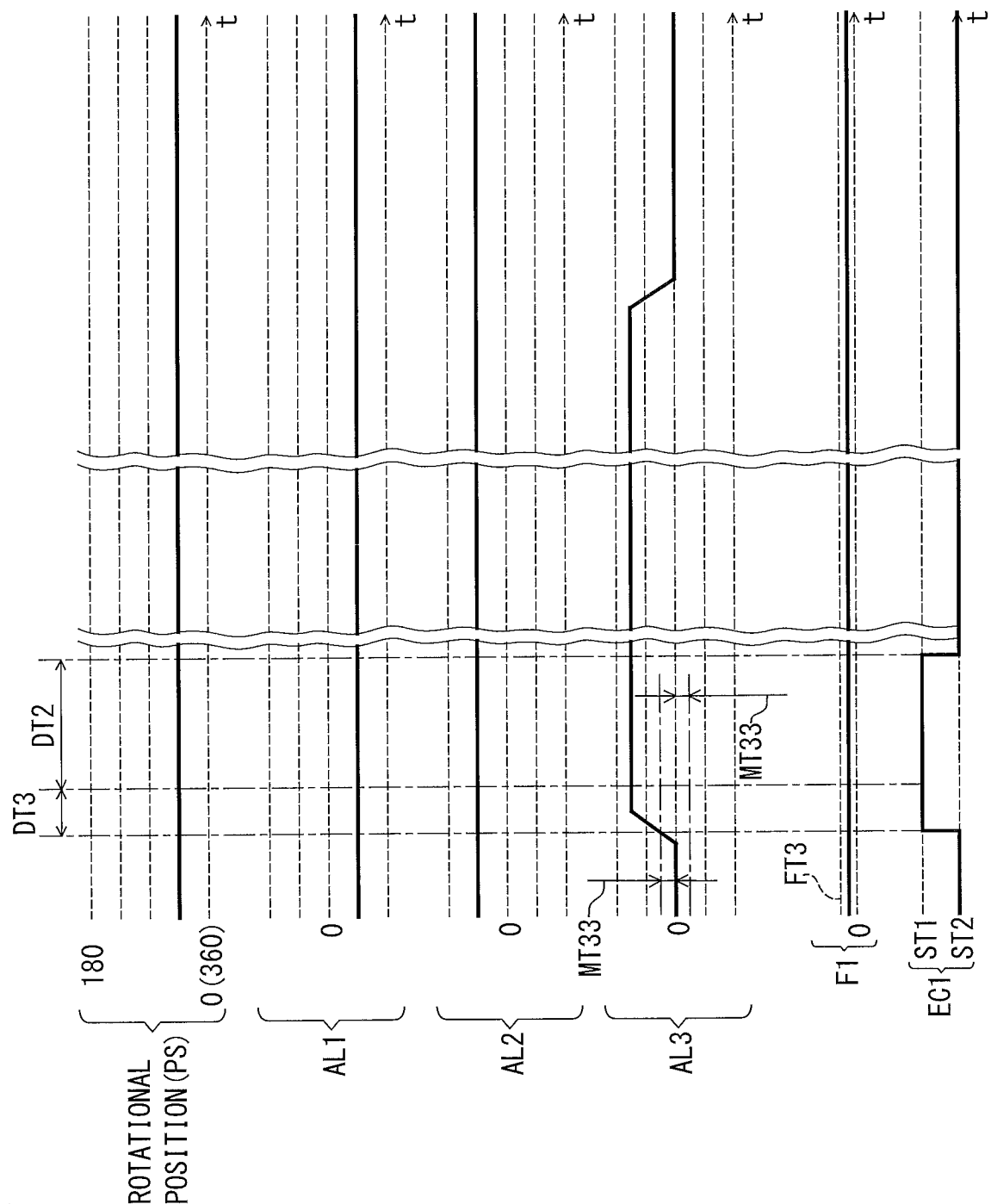

As seen in FIG. 7, the wake condition is free of the axial acceleration AL3. As seen in FIG. 11, however, the wake condition can include the axial acceleration AL3 if needed and/or desired. In such embodiments, the electronic controller EC1 is configured to change the state of the electrical device 12 from the second state ST2 to the first state ST1 in at least one of the case where the amount of change in the radial acceleration AL1 is greater than or equal to the radial acceleration threshold MT31, the case where the amount of change in the rotational acceleration AL2 is greater than or equal to the rotational acceleration threshold MT32, a case where the axial acceleration AL3 is greater than or equal to an axial acceleration threshold MT33, and the case where the force F1 is greater than or equal to the wake force threshold FT3.

As seen in FIG. 11, for example, the electronic controller EC1 is configured to change the state of the electrical device 12 from the first state ST1 to the second state ST2 in a case where the electronic controller EC1 changes the state of the electrical device 12 from the second state ST2 to the first state ST1 in response to the axial acceleration AL3 defined in the axial direction D4 parallel to the rotational axis A1 of the rotational device 10. The electronic controller EC1 is configured to change the state of the electrical device 12 from the first state ST1 to the second state ST2 in the case where the axial acceleration AL3 is greater than or equal to the axial acceleration threshold MT33. The electronic controller EC1 can be configured to change the state of the electrical device 12 from the first state ST1 to the second state ST2 immediately after the electronic controller EC1 changes the state of the electrical device 12 from the second state ST2 to the first state ST1 in response to the axial acceleration AL3.

Figure 12:
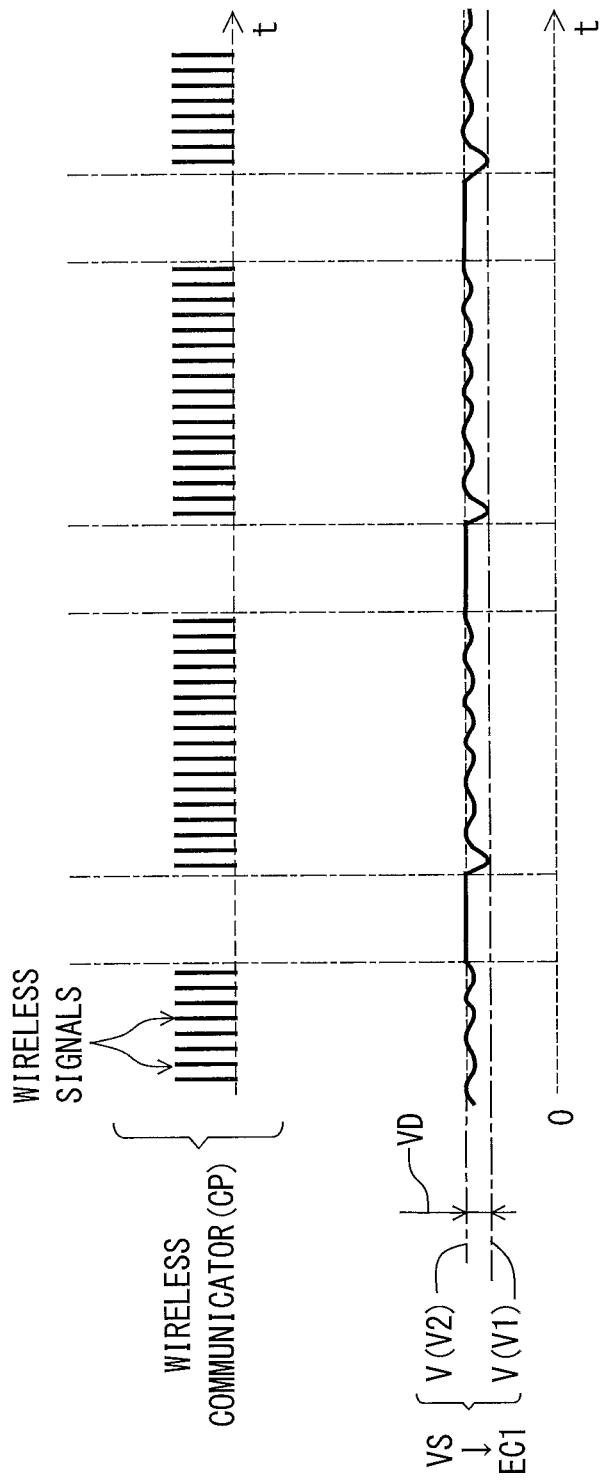
FIG. 12 is a timing chart showing control of the electrical device of the rotational device illustrated in FIG. 1.

As seen in FIG. 12, the electronic controller EC1 is electrically connected to the power-source sensor VS to obtain the output voltage V sensed by the power-source sensor VS in response to power supply from the electric power source 42 to the electric component CP. The electronic controller EC1 is configured to calculate a level of charge of the electric power source 42 based on the output voltage V. The level of charge includes a state-of-charge (SOC) of the electric power source 42. The electronic controller EC1 is configured to calculate the state-of-charge based on the output voltage V.

The electronic controller EC1 is configured to obtain, as a first output voltage V1, the output voltage V sensed by the power-source sensor VS in response to the power supply. The electronic controller EC1 is configured to obtain, as a second output voltage V2, the output voltage V sensed by the power-source sensor VS in response to decrease in the power supply. The electronic controller EC1 is configured to calculate the level of charge of the electric power source 42 based on the first output voltage V1 and the second output voltage V2. The electronic controller EC1 is configured to calculate the SOC of the electric power source 42 based on the first output voltage V1 and the second output voltage V2.

For example, the electronic controller EC1 is configured to calculate the level of charge of the electric power source 42 based on a voltage difference VD between the first output voltage V1 and the second output voltage V2. The electronic controller EC1 is configured to calculate the level of charge of the electric power source 42 based on the voltage difference VD and a relationship between the voltage difference VD and the level of charge of the electric power source 42. The electronic controller EC1 is configured to calculate the SOC of the electric power source 42 based on the voltage difference VD between the first output voltage V1 and the second output voltage V2. The electronic controller EC1 is configured to calculate the SOC of the electric power source 42 based on the voltage difference VD and the relationship between the voltage difference VD and the SOC of the electric power source 42. The electronic controller EC1 stores the relationship between the voltage difference VD and the SOC of the electric power source 42. The relationship includes a relational expression indicative of a relationship between the voltage difference VD and the SOC.

The electronic controller EC1 can be configured to calculate the level of charge of the electric power source 42 based on at least one factor other than voltage difference VD between the first output voltage V1 and the second output voltage V2 if needed and/or desired.

For example, the electronic controller EC1 is configured to obtain the output voltage V sensed by the power-source sensor VS in response to power supply from the electric power source 42 to the wireless communicator WC1. The electronic controller EC1 is configured to obtain, as the first output voltage V1, the output voltage V sensed by the power-source sensor VS in response to the power supply to the wireless communicator WC1. The electronic controller EC1 is configured to obtain, as the second output voltage V2, the output voltage V sensed by the power-source sensor VS in response to decrease in the power supply to the wireless communicator WC1.

The electronic controller EC1 is configured to obtain, as the first output voltage V1, the output voltage V sensed by the power-source sensor VS while the wireless communicator WC1 transmits wireless signals. The electronic controller EC1 is configured to obtain, as the second output voltage V2, the output voltage V sensed by the power-source sensor VS while the wireless communicator WC1 stops to transmit wireless signals. The electronic controller EC1 is configured to calculate the voltage difference VD between the first output voltage V1 and the second output voltage V2. The electronic controller EC1 is configured to subtract the first output voltage V1 from the second output voltage V2 to calculate the voltage difference VD. The electronic controller EC1 is configured to obtain the SOC based on the relational expression. The electronic controller EC1 stores the SOC in the hardware memory 30M.

Figure 13:
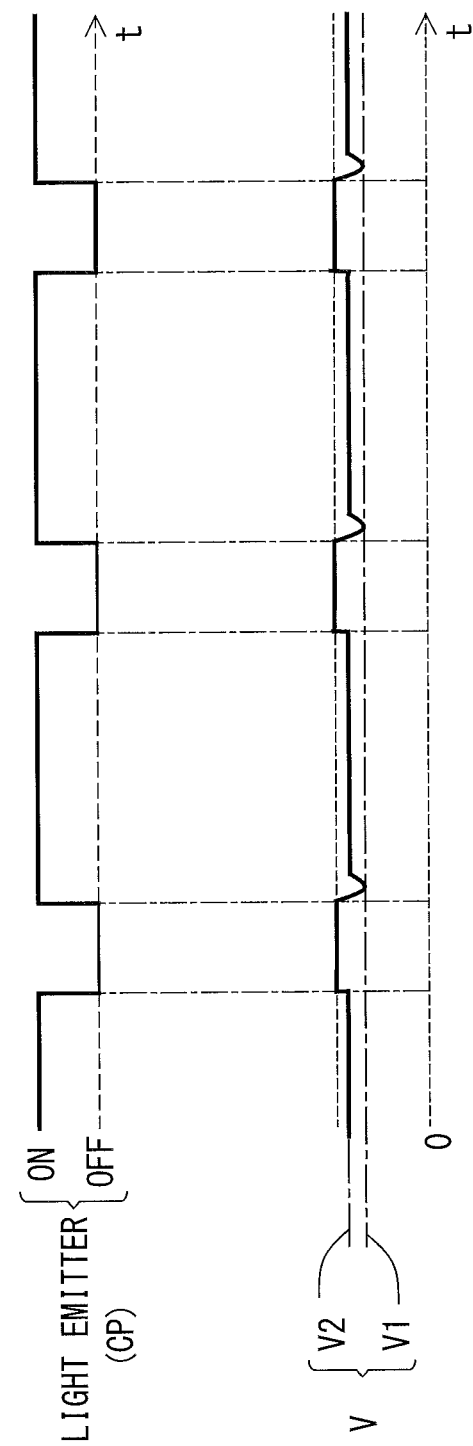
FIG. 13 is a timing chart showing control of an electrical device in accordance with a modification.

As seen in FIG. 13, the electronic controller EC1 can be configured to obtain the output voltage V sensed by the power-source sensor VS in response to power supply from the electric power source 42 to the light emitter LE. In the modification depicted in FIG. 6, the electronic controller EC1 is configured to obtain, as the first output voltage V1, the output voltage V sensed by the power-source sensor VS in response to the power supply to the light emitter LE. The electronic controller EC1 is configured to obtain, as the second output voltage V2, the output voltage V sensed by the power-source sensor VS in response to decrease in the power supply to the light emitter LE.

The electronic controller EC1 is configured to obtain, as the first output voltage V1, the output voltage V sensed by the power-source sensor VS while the light emitter LE is turned on. The electronic controller EC1 is configured to obtain, as the second output voltage V2, the output voltage V sensed by the power-source sensor VS while the light emitter LE is turned off. The electronic controller EC1 is configured to calculate the voltage difference VD between the first output voltage V1 and the second output voltage V2. The electronic controller EC1 is configured to subtract the first output voltage V1 from the second output voltage V2 to calculate the voltage difference VD. The electronic controller EC1 is configured to obtain the SOC based on the relational expression. The electronic controller EC1 stores the SOC in the hardware memory 30M.

Figure 14:
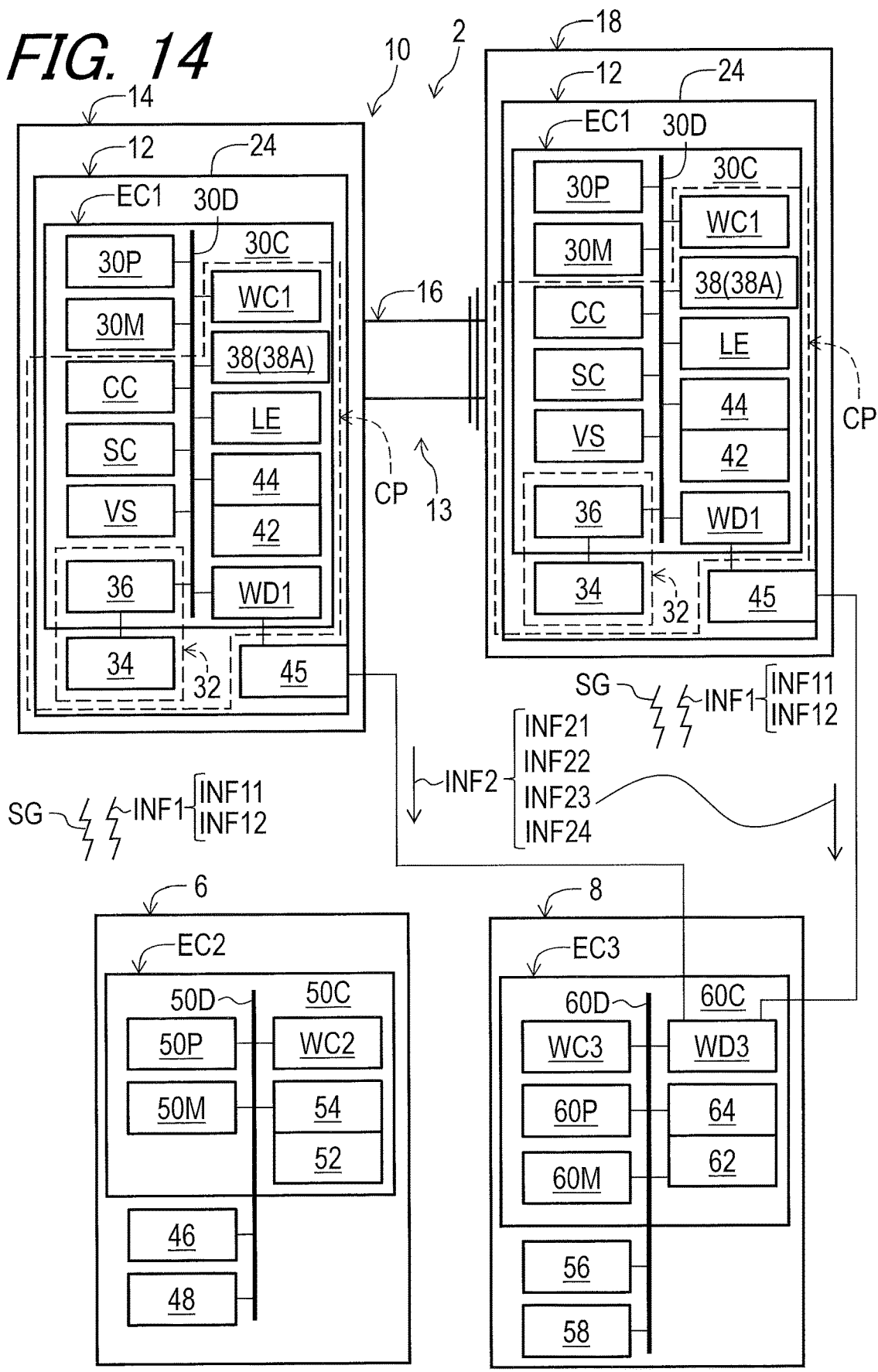
FIG. 14 is a schematic block diagram of a rotational device in accordance with a modification.

As seen in FIG. 14, the electrical device 12 can be provided to the crank arm 18 if needed and/or desired. In such embodiments, the rotational device 10 includes at least one of the electrical device 12 provided to the crank arm 14 and the electrical device 12 provided to the crank arm 18. The electrical device 12 provided to the crank arm 18 is configured to wirelessly transmit the rotational information INF of the crank arm 18 while the electrical device 12 provided to the crank arm 14 is configured to wirelessly transmit the rotational information INF1 of the crank arm 14. The additional electrical device 6 is configured to separately display the power INF11 applied to the crank arm 14 and the power INF11 applied to the crank arm 18. The additional electrical device 6 is configured to display one of the rotational speed INF12 of the crank arm 14 and the rotational speed INF12 of the crank arm 18. The additional electrical device 6 can be configured to display an average value of the rotational speed INF12 of the crank arm 14 and the rotational speed INF12 of the crank arm 18.

Second Embodiment

A rotational device 210 in accordance with a second embodiment will be described below referring to FIGS. 15 and 16. The rotational device 210 has the same structure and/or configuration as those of the rotational device 10 except for the arrangement of the electrical device 12. Thus, elements having substantially the same function as those in the first embodiment will be numbered the same here and will not be described and/or illustrated again in detail here for the sake of brevity.

Figure 15:
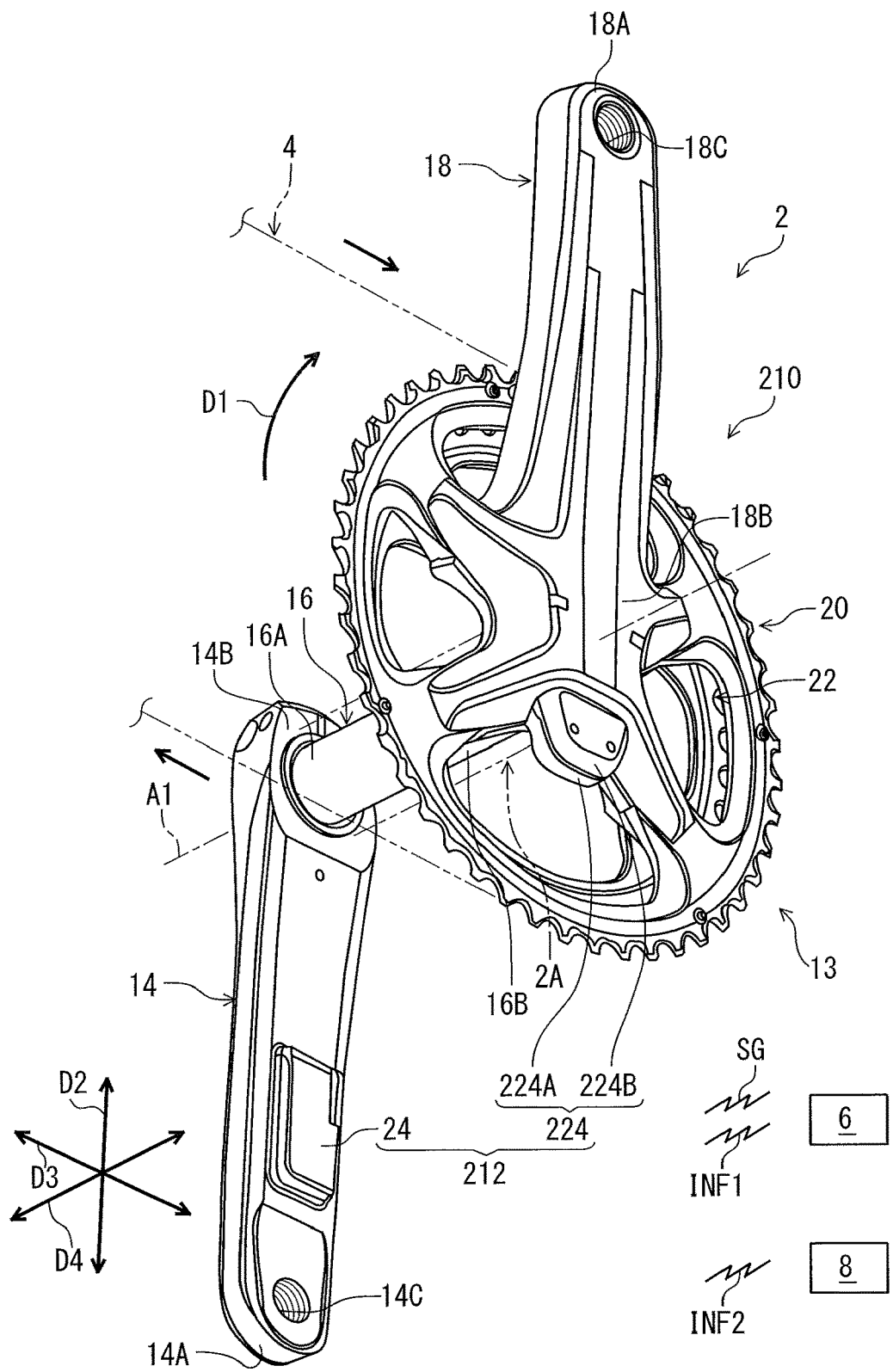
FIG. 15 is a perspective view of a rotational device in accordance with a second embodiment.
Figure 16:
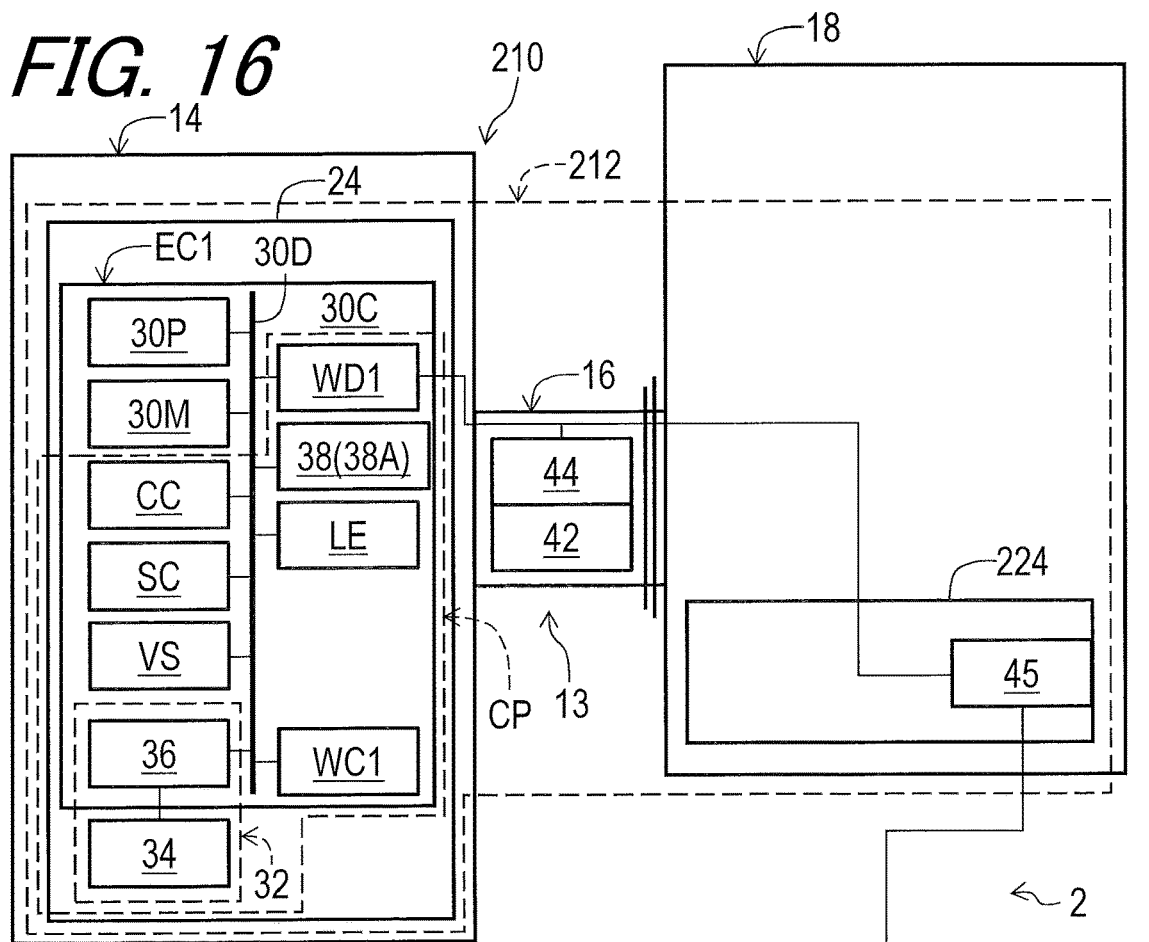
FIG. 16 is a schematic block diagram of the rotational device illustrated in FIG. 15.
Figure 16:
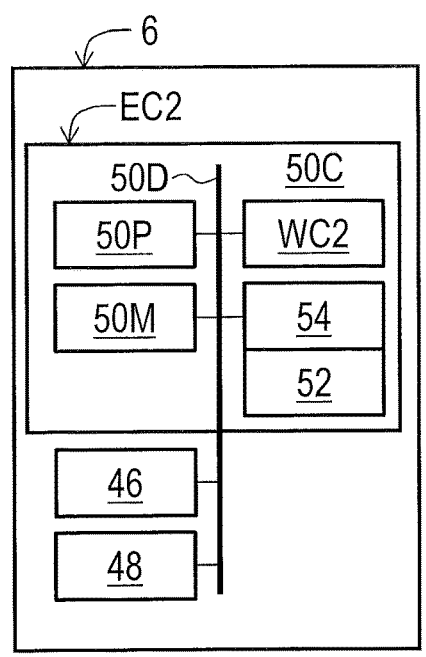
Figure 16:
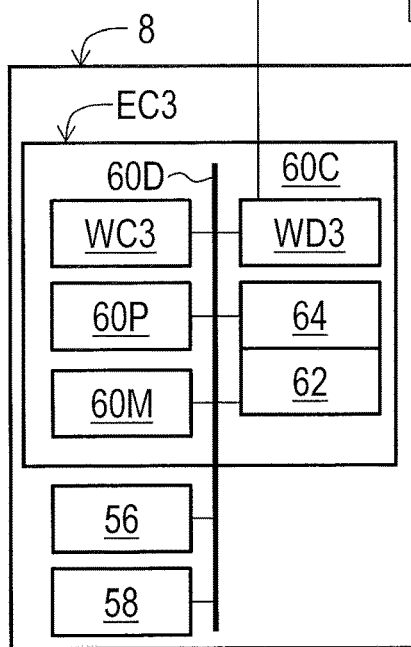

As seen in FIGS. 15 and 16, the rotational device 210 comprises the crank arm 14, the crank arm 18, and the crank axle 16. The rotational device 210 for the human-powered vehicle 2 comprises an electrical device 212. The electrical device 212 has substantially the same structure as the structure of the electrical device 12 of the first embodiment. The electrical device 212 is at least partially provided to at least one of the crank axle 16, the crank arm 14, and the sprocket 20 and/or 22. The electrical device 212 is at least partially provided to the crank arm 14.

As seen in FIG. 16, the electrical device 212 is partially provided to the crank arm 14, partially provided to the crank axle 16, and partially provided to the crank arm 18. The wireless communicator WC1, the electronic controller EC1, the force sensor 32, and the position sensor 38 are provided to the crank arm 14. The electric power source 42 and the power-source holder 44 are provided to the crank axle 16. The connector port 45 is provided to the crank arm 18. The power-source holder 44 is electrically connected to the electronic controller EC1 and the connector port 45 via an electric cable 31.

As seen in FIG. 15, the electrical device 212 includes the housing 24 and an additional housing 224. The additional housing 224 is attached to the crank arm 18. The connector port 45 is coupled to the additional housing 224. For example, the additional housing 224 includes a housing body 224A and a lid 224B. The housing body 224A is secured to the crank arm 18. The lid 224B is detachably attached to the housing body 224A to cover the connector port 45 at least partially. The connector port 45 is connectable to an electric cable 31 to charge the electric power source 42 via the connector port 45 and the power-source holder 44.

Figure 17:
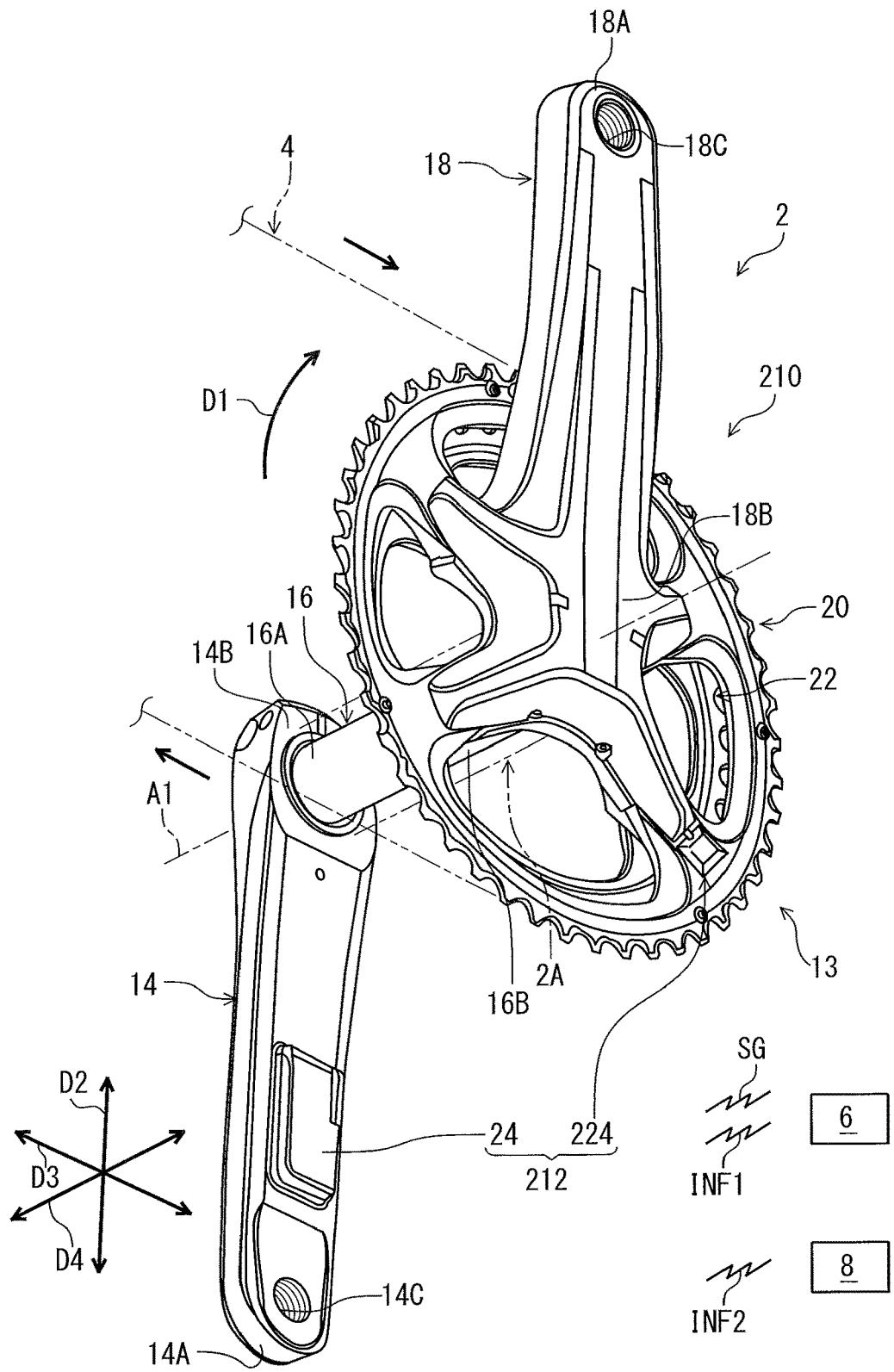
FIG. 17 is a perspective view of a rotational device in accordance with a modification.

As seen in the modification depicted in FIG. 17, the electrical device 212 can be at least partially provided to the sprocket 20 if needed and/or desired. The additional housing 224 can be attached to the sprocket 20 if needed and/or desired.

Third Embodiment

A rotational device 310 in accordance with a third embodiment will be described below referring to FIGS. 18 to 20. The rotational device 310 has the same structure and/or configuration as those of the rotational device 210 except for an additional force sensor. Thus, elements having substantially the same function as those in the first and second embodiments will be numbered the same here and will not be described and/or illustrated again in detail here for the sake of brevity.

Figure 18:
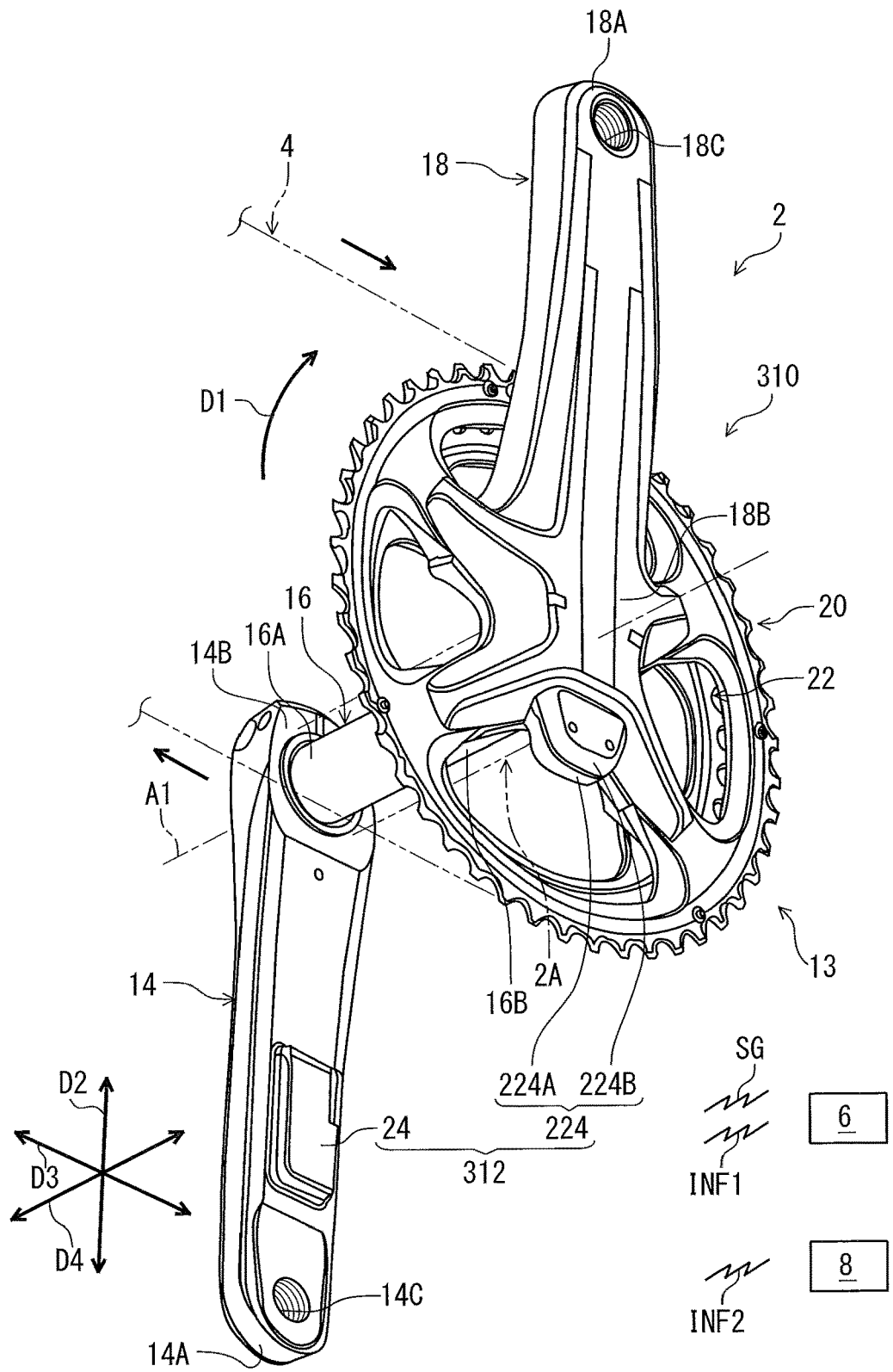
FIG. 18 is a perspective view of a rotational device in accordance with a third embodiment.
Figure 19:
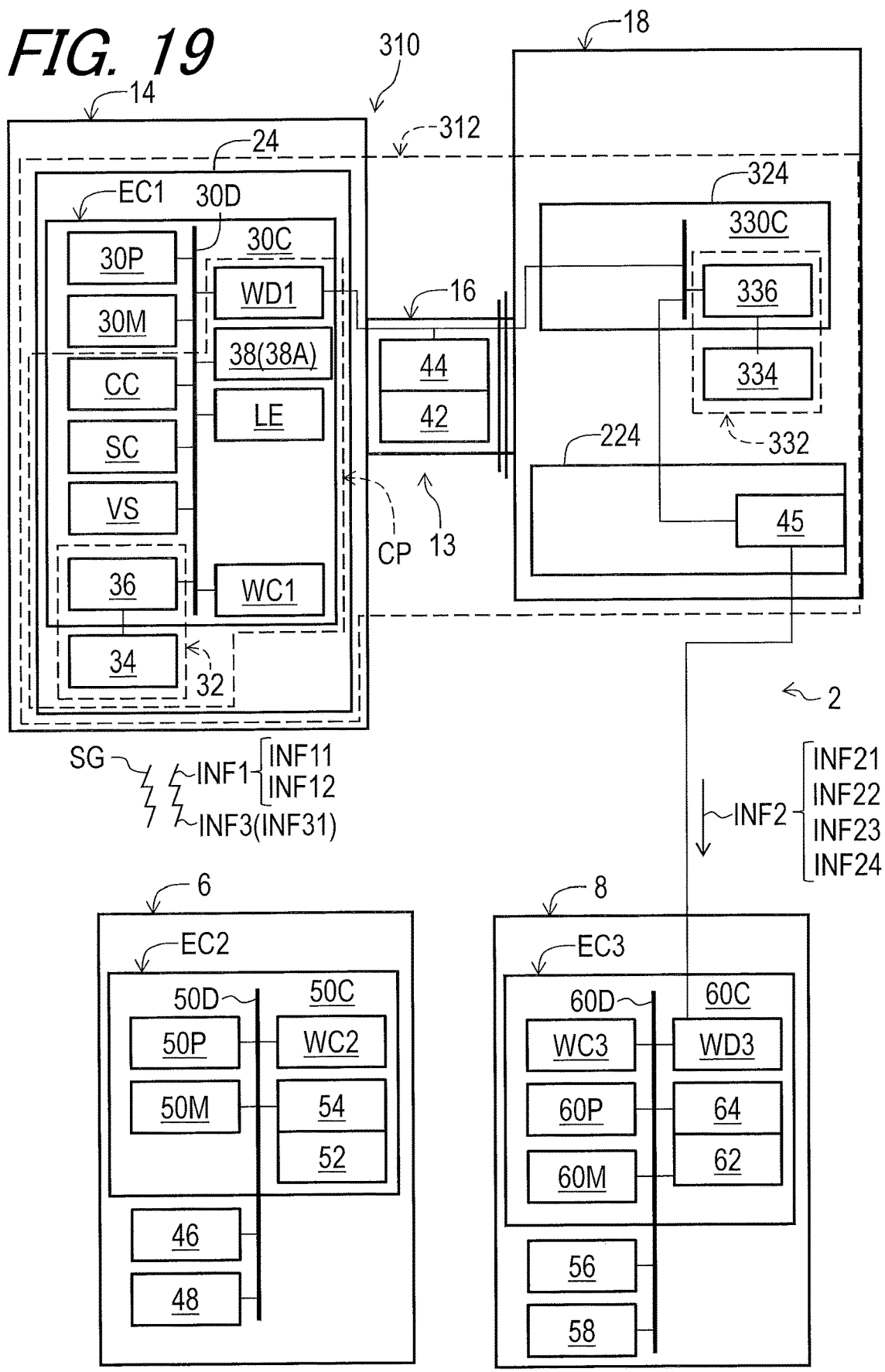
FIG. 19 is a schematic block diagram of the rotational device illustrated in FIG. 18.

As seen in FIGS. 18 and 19, the rotational device 310 comprises the crank arm 14, the crank arm 18, and the crank axle 16. The rotational device 310 for the human-powered vehicle 2 comprises an electrical device 312. The electrical device 312 has substantially the same structure as the structure of the electrical device 212 of the second embodiment. The electrical device 312 is at least partially provided to at least one of the crank axle 16, the crank arm 14, and the sprocket 20 and/or 22. The electrical device 312 is at least partially provided to the crank arm 14.

As seen in FIG. 19, the electrical device 312 is partially provided to the crank arm 14, partially provided to the crank axle 16, and partially provided to the crank arm 18. The wireless communicator WC1, the electronic controller EC1, the force sensor 32, and the position sensor 38 are provided to the crank arm 14. The electric power source 42 and the power-source holder 44 are provided to the crank axle 16. The connector port 45 is provided to the crank arm 18. The power-source holder 44 is electrically connected to the electronic controller EC1 via an electric cable 31. The power-source holder 44 is electrically connected to the connector port 45 via an electric cable 31.

The wireless communicator WC1 is configured to wirelessly transmit the rotational information INF relating to the rotational device 310. Furthermore, the wireless communicator WC1 is configured to wirelessly transmit rotational information INF3 relating to the rotational device 310. The electrical device 312 further comprises a force sensor 332. The force sensor 332 is configured to obtain the rotational information INF3. The electronic controller EC1 is configured to receive the rotational information INF3 obtained by the force sensor 332. The electronic controller EC1 is electrically connected to the force sensor 332 to receive the rotational information INF3 obtained by the force sensor 332.

The rotational information INF3 includes at least one of: power applied to the rotational device 310, a deformation amount of the rotational device 310; a force applied to the rotational device 310; a rotational position of the rotational device 310; and the rotational speed (e.g., a cadence) of the rotational device 310. The force sensor 332 is configured to obtain at least one of: the deformation amount of the rotational device 310; the force applied to the rotational device 310; and the rotational speed (e.g., a cadence) of the rotational device 310. The rotational information INF3 includes at least one of: the deformation amount of the rotational device 310; and the force applied to the rotational device 310. The force sensor 332 is configured to obtain at least one of: the deformation amount of the rotational device 310; and the force applied to the rotational device 310.

In the present embodiment, the rotational information INF3 includes the deformation amount of the rotational device 310. The force sensor 332 is configured to obtain the deformation amount of the rotational information INF3. The rotational information INF3 includes a deformation amount of the crank arm 18 as the deformation amount of the rotational device 310. The force sensor 332 is configured to obtain the deformation amount of the crank arm 18. However, the rotational information INF3 can include a deformation amount of another part of the rotational device 310 if needed and/or desired. The rotational information INF3 can include a force applied to the rotational device 310 instead of or in addition to the deformation amount of the rotational device 310 if needed and/or desired. The force sensor 332 can be configured to obtain at least one of: the deformation amount of the rotational device 310; and the force applied to the rotational device 310 if needed and/or desired.

For example, the force sensor 332 includes a strain gauge 334 and a measurement circuit 336. The strain gauge 334 is attached to the crank arm 18. The strain gauge 334 is configured to output a change in electrical resistance depending on the deformation amount of the rotational device 310. The strain gauge 334 is configured to output the change in the electrical resistance depending on the deformation amount of the crank arm 18. The measurement circuit 336 is electrically connected to the strain gauge 334 to convert the output of the strain gauge 334 to a voltage indicating the deformation amount of the rotational device 310 (e.g., the crank arm 18). For example, the measurement circuit 336 constitutes a bridge circuit with the strain gauge 334.

The measurement circuit 336 is electrically connected to the electronic controller EC1. The electrical device 312 includes a circuit board 330C provided to the crank arm 18. The electronic controller EC1, the power-source holder 44, and the connector port 45 are electrically connected to the circuit board 330C. The measurement circuit 336 is electrically mounted on the circuit board 330C. For example, the measurement circuit 336 is electrically connected to strain gauge 334 via the circuit board 330C and an additional circuit board such as a flexible printed circuit. The electronic controller EC1 is electrically connected to the measurement circuit 336 to receive the rotational information INF3. The electronic controller EC1 is electrically connected to the measurement circuit 336 to receive the rotational information INF3. The electronic controller EC1 is electrically connected to the measurement circuit 336 to receive the deformation amount of the rotational device 310 (e.g., the crank arm 18).

The electronic controller EC1 is configured to calculate the rotational information INF3 based on the deformation amount of the rotational device 310 (e.g., the crank arm 18) obtained by the force sensor 332. The electronic controller EC1 is configured to calculate the force (e.g., torque) applied to the rotational device 310 based on the deformation amount of the rotational device 310 (e.g., the crank arm 18) obtained by the force sensor 332. For example, the electronic controller EC1 is configured to calculate, as the rotational information INF3, power INF31 applied to the rotational device 310 based on the torque applied to the rotational device 310 (e.g., the crank arm 18) and a rotational speed INF32 of the rotational device 310. However, the electronic controller EC1 can be configured to calculate the power INF31 applied to the rotational device 310 based on other data such as a force applied to the rotational device 310 and a rotational speed of the rotational device 310 if needed and/or desired. For example, the electronic controller EC1 can be configured to calculate an average of the power INF31 during one revolution of the crank arm 18.

The electronic controller EC1 is configured to control the wireless communicator WC1 to wirelessly transmit the rotational information INF3 obtained by the force sensor 332. The electronic controller EC1 is configured to control the wireless communicator WC1 to wirelessly transmit, as the rotational information INF3, the power INF31 calculated by the electronic controller EC1 based on the force detected by the force sensor 332.

Figure 20:
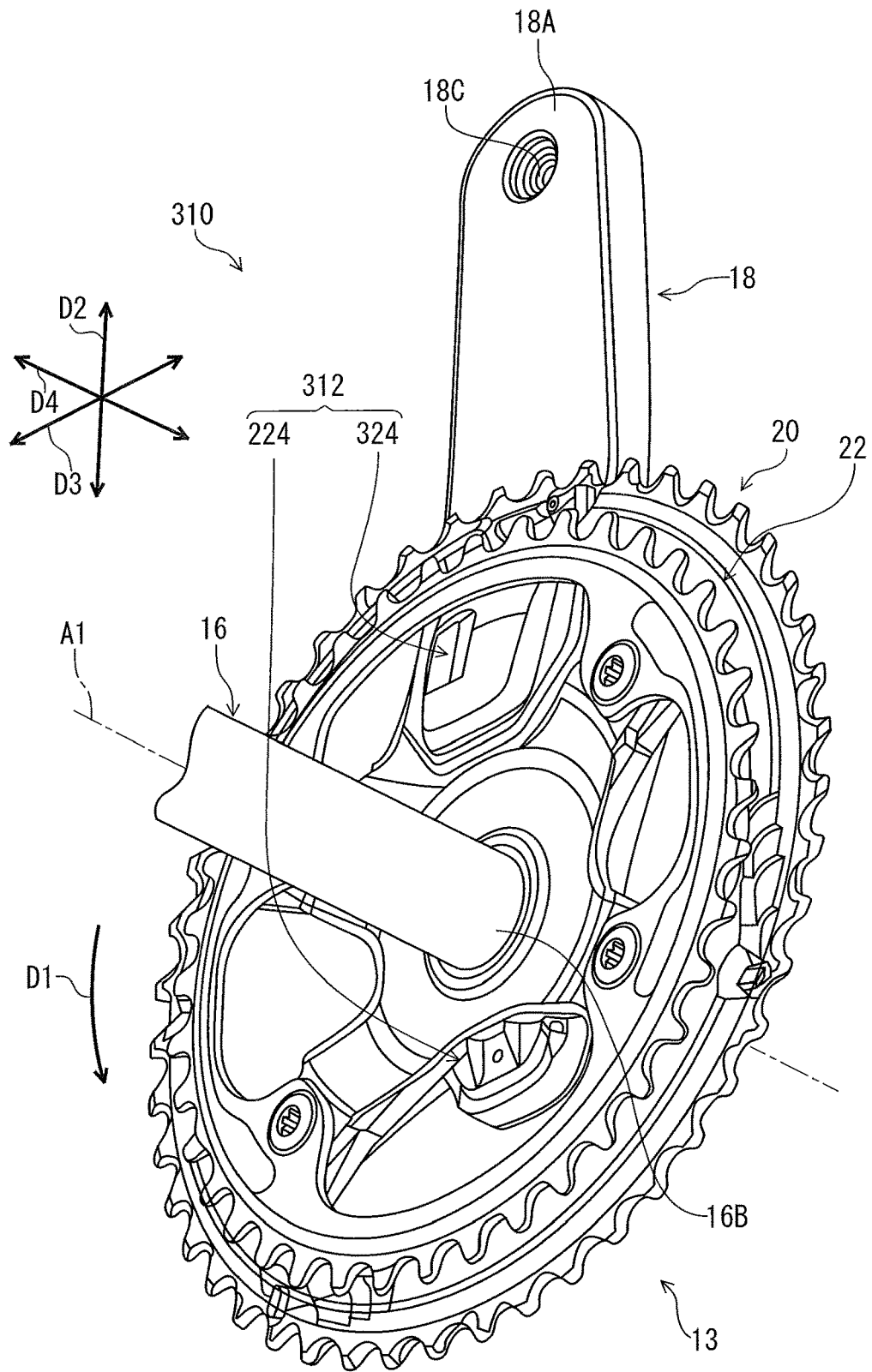
FIG. 20 is another perspective view of the rotational device illustrated in FIG. 18.

As seen in FIGS. 18 and 20, the electrical device 312 includes the housing 24, the additional housing 224, and an additional housing 324. The additional housing 324 is attached to the crank arm 18. As seen in FIG. 19, the force sensor 332 is provided in the additional housing 324. The connector port 45 can be coupled to the additional housing 324 if needed and/or desired. In such embodiments, the additional housing 224 can be omitted from the electrical device 312.

The description regarding the stopping of the wireless transmission of the rotational information INF can be utilized as the description regarding stopping of the wireless transmission of the rotational information INF3 by replacing the reference numerals "INF1," "INF11," "10," "12," and "14" with "INF3," "INF31," "310," "312," and "18." Thus, the description regarding the stopping of the wireless transmission of the rotational information INF3 will not be described in detail here for the sake of brevity.

Fourth Embodiment

A rotational device 410 in accordance with a fourth embodiment will be described below referring to FIGS. 21 to 23. The rotational device 410 has the same structure and/or configuration as those of the rotational device 10 except that the rotational device 410 includes a pedal. Thus, elements having substantially the same function as those in the first to third embodiments will be numbered the same here and will not be described and/or illustrated again in detail here for the sake of brevity.

Figure 21:
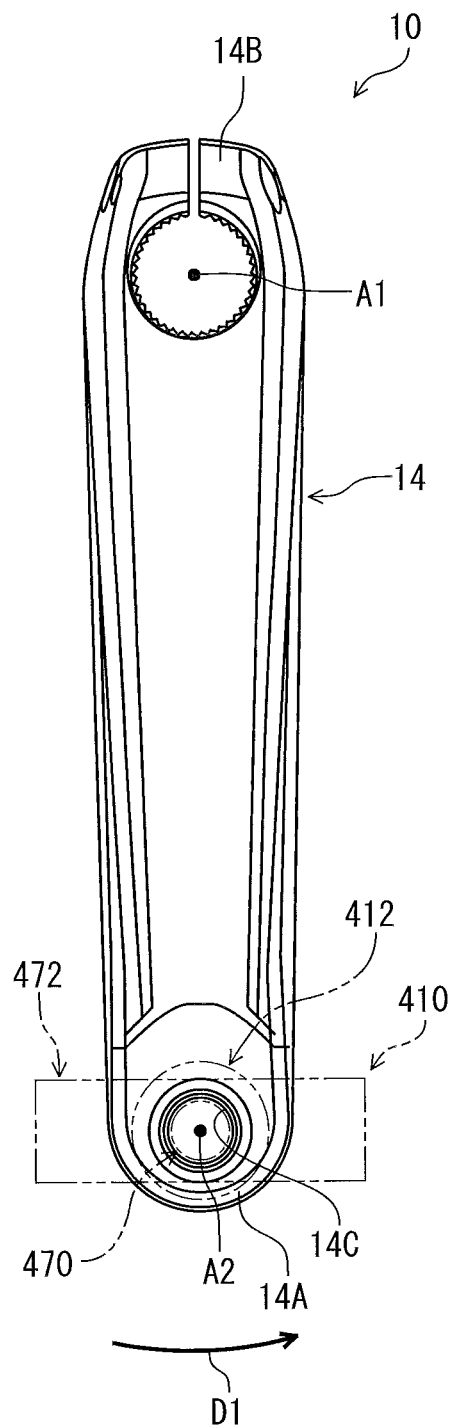
FIG. 21 is a side-elevational view of a rotational device in accordance with a fourth embodiment.
Figure 22:
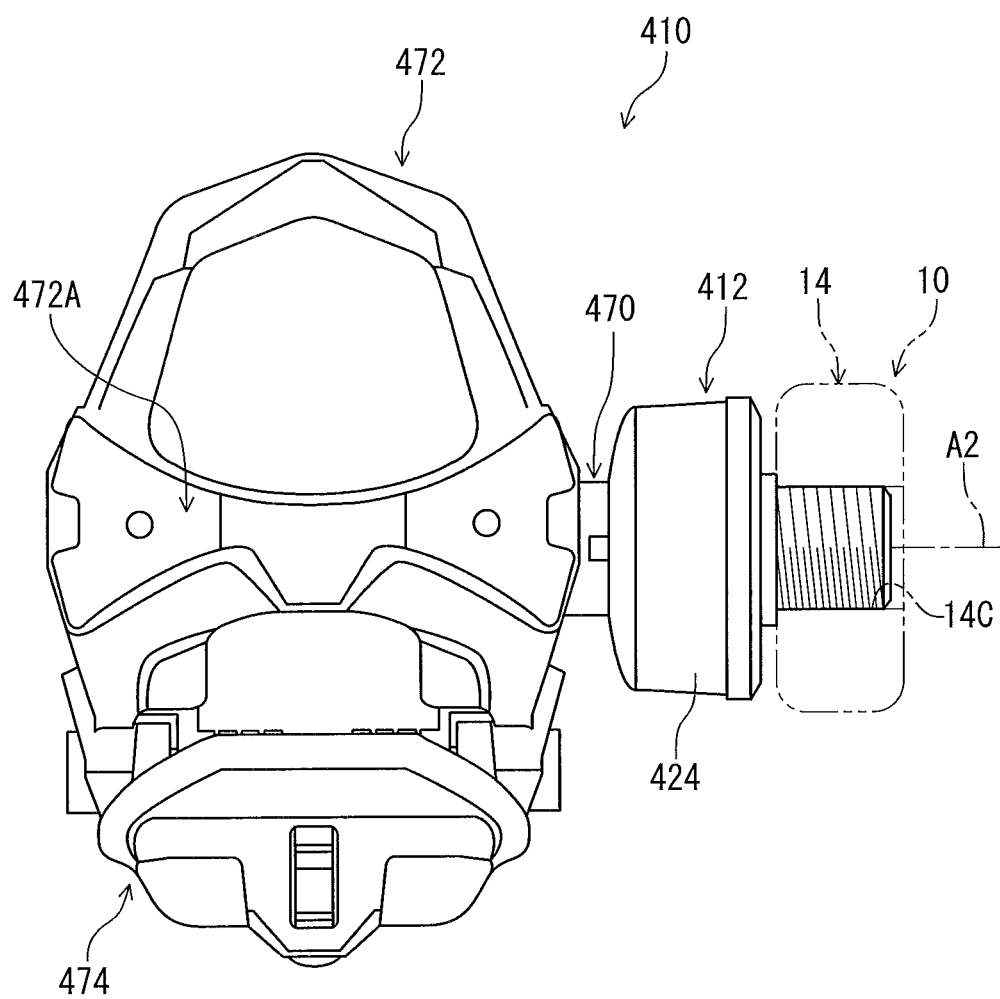
FIG. 22 is a top view of the rotational device illustrated in FIG. 21.

As seen in FIGS. 21 and 22, the rotational device 410 for the human-powered vehicle 2 comprises a pedal axle 470, a pedal body 472, and an electrical device 412. The rotational device 410 for the human-powered vehicle 2 comprises a pedal axle 470, a pedal body 472, and an electrical device 412. The pedal axle 470 is configured to be secured to the crank arm 14 of the rotational device 10. The pedal axle 470 includes a threaded part 470A. The threaded part 470A of the pedal axle 470 is configured to be threadedly engaged with the pedal attachment hole 14C of the crank arm 14. The threaded part 470A of the pedal axle 470 can be threadedly engaged with the pedal attachment hole 18C of the crank arm 18.

The pedal body 472 is rotatably coupled to the pedal axle 470. The pedal body 472 is rotatably coupled to the pedal axle 470 about a rotational axis A2. The pedal axle 470 extends along the rotational axis A2. The pedal body 472 includes a tread surface 472A on which a shoe of the user is to be put. The pedal body 472 includes a binding structure 474 to which a cleat of the shoe is to be fixedly coupled. However, the binding structure 474 can be omitted from the pedal body 472 if needed and/or desired.

As seen in FIG. 22, the electrical device 412 is at least partially provided to at least one of the pedal axle 470 and the pedal body 472. In the present embodiment, the electrical device 412 is entirely provided to the pedal axle 470. However, the electrical device 412 can be at least partially provided to at least one of the pedal axle 470 and the pedal body 472 if needed and/or desired.

Figure 23:
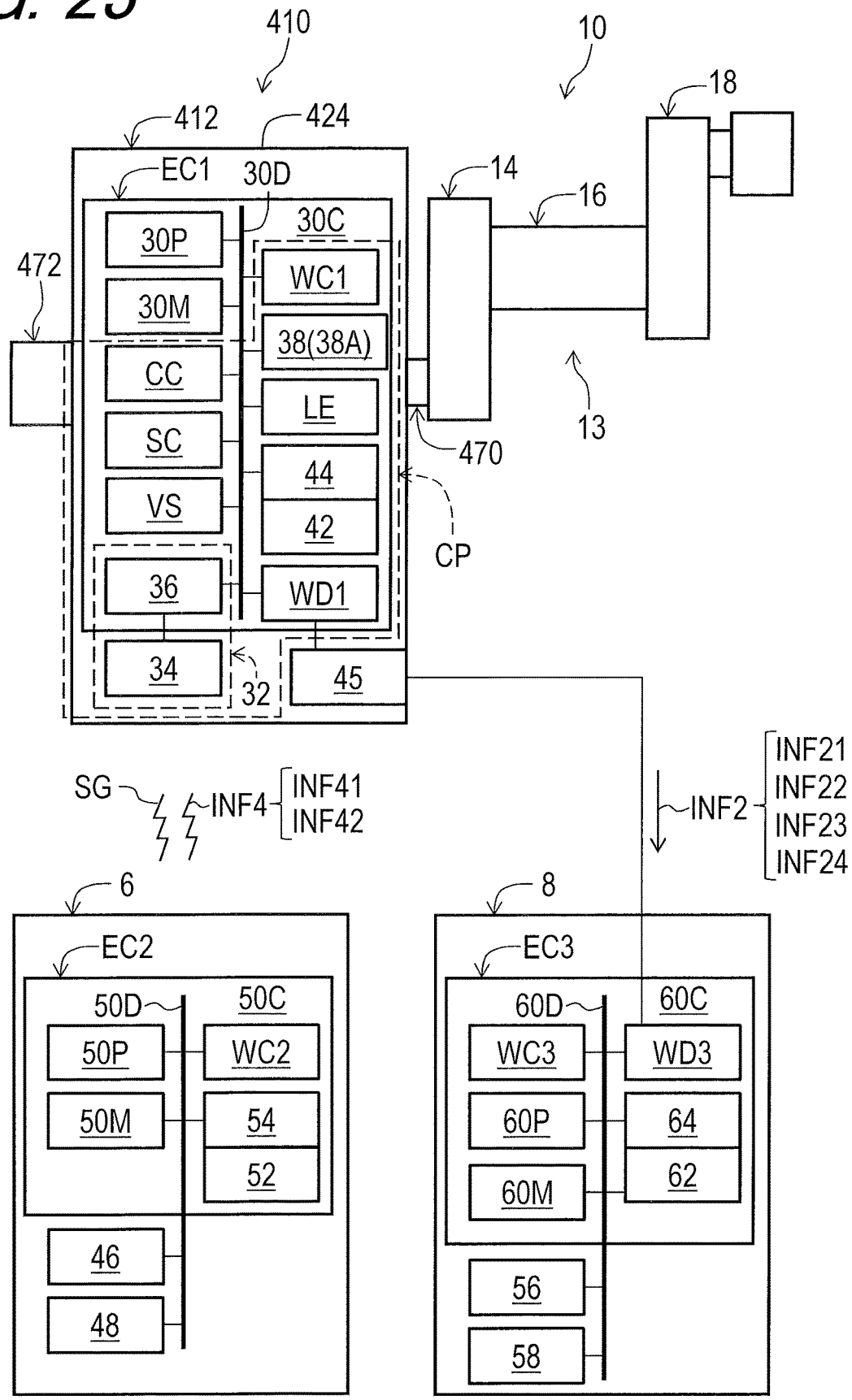
FIG. 23 is a schematic block diagram of the rotational device illustrated in FIG. 21.

As seen in FIG. 23, the electrical device 412 comprises the wireless communicator WC1, the electronic controller EC1, the force sensor 32, the position sensor 38, the electric power source 42, the power-source holder 44, and the connector port 45. The electrical device 412 includes a housing 424. The housing 424 is coupled to the pedal axle 470 (see e.g., FIG. 22). The wireless communicator WC1, the electronic controller EC1, the force sensor 32, the position sensor 38, the electric power source 42, and the power-source holder 44 are provided in the housing 424.

The wireless communicator WC1 is configured to wirelessly communicate with the additional wireless communicator WC2 of the additional electrical device 6. The wireless communicator WC1 is configured to wirelessly transmit rotational information INF4 relating to the rotational device 410.

The force sensor 32 is configured to obtain the rotational information INF4. The electronic controller EC1 is configured to receive the rotational information INF4 obtained by the force sensor 32. The electronic controller EC1 is electrically connected to the force sensor 32 to receive the rotational information INF4 obtained by the force sensor 32.

The rotational information INF4 includes at least one of: power applied to the rotational device 410, a deformation amount of the rotational device 410; a force applied to the rotational device 410; a rotational position of the rotational device 410; and the rotational speed (e.g., a cadence) of the rotational device 410. The force sensor 32 is configured to obtain at least one of: the deformation amount of the rotational device 410; the force applied to the rotational device 410; and the rotational speed (e.g., a cadence) of the rotational device 410. The rotational information INF4 includes at least one of: the deformation amount of the rotational device 410; and the force applied to the rotational device 410. The force sensor 32 is configured to obtain at least one of: the deformation amount of the rotational device 410; and the force applied to the rotational device 410.

In the present embodiment, the rotational information INF4 includes the deformation amount of the rotational device 410. The force sensor 32 is configured to obtain the deformation amount of the rotational information INF4. The rotational information INF4 includes a deformation amount of the pedal axle 470 as the deformation amount of the rotational device 410. The force sensor 32 is configured to obtain the deformation amount of the pedal axle 470. However, the rotational information INF4 can include a deformation amount of another part of the rotational device 410 if needed and/or desired. The rotational information INF4 can include a force applied to the rotational device 410 instead of or in addition to the deformation amount of the rotational device 410 if needed and/or desired. The force sensor 32 can be configured to obtain at least one of: the deformation amount of the rotational device 410; and the force applied to the rotational device 410 if needed and/or desired.

For example, the strain gauge 34 is attached to the pedal axle 470. The strain gauge 34 is configured to output a change in electrical resistance depending on the deformation amount of the rotational device 410. The strain gauge 34 is configured to output the change in the electrical resistance depending on the deformation amount of the pedal axle 470. The measurement circuit 36 is electrically connected to the strain gauge 34 to convert the output of the strain gauge 34 to a voltage indicating the deformation amount of the rotational device 410 (e.g., the pedal axle 470).

The measurement circuit 36 is electrically connected to the electronic controller EC1. The measurement circuit 36 is electrically mounted on the circuit board 30C of the electronic controller EC1. For example, the measurement circuit 36 is electrically connected to strain gauge 34 via the circuit board 30C and an additional circuit board such as a flexible printed circuit. The electronic controller EC1 is electrically connected to the measurement circuit 36 to receive the rotational information INF4. The electronic controller EC1 is electrically connected to the measurement circuit 36 to receive the rotational information INF4. The electronic controller EC1 is electrically connected to the measurement circuit 36 to receive the deformation amount of the rotational device 410 (e.g., the pedal axle 470).

The position sensor 38 is configured to sense the rotational position of the rotational device 410. The position sensor 38 is configured to sense the rotational position of the rotational device 410 about the rotational axis A1. The position sensor 38 is configured to sense the inclination angle of the pedal axle 470 about the rotational axis A1.

In the present embodiment, the position sensor 38 includes an accelerometer 38A. The accelerometer 38A is configured to sense an inclination angle of the pedal axle 470 about the rotational axis A1 as the rotational position of the rotational device 410. The inclination angle of the pedal axle 470 indicates the rotational position of the rotational device 410. The position sensor 38 can include a gyro meter instead of or in additional to the accelerometer 38A.

The electronic controller EC1 is configured to receive a rotational position of the rotational device 410 detected by the position sensor 38. The electronic controller EC1 is electrically connected to the position sensor 38 to receive the rotational position detected by the position sensor 38. The electronic controller EC1 is electrically connected to the accelerometer 38A to receive the inclination angle detected by the accelerometer 38A. The electronic controller EC1 is configured to calculate the rotational position of the rotational device 410 based on the inclination angle detected by the accelerometer 38A. The position sensor 38 can include other sensors such as a gyro meter or a magnetic sensor (e.g., a magnetic body and a hall sensor) instead of or in addition to the accelerometer 38A if needed and/or desired.

The electronic controller EC1 is configured to count the number of revolutions of the rotational device 410 per unit time based on the rotational position detected by the position sensor 38. Namely, the electronic controller EC1 is configured to obtain a cadence of the rotational device 410 based on the rotational position detected by the position sensor 38. However, the electrical device 412 can include a cadence sensor which is a separate sensor from the position sensor 38 if needed and/or desired. In such embodiments, the cadence sensor includes a detection object and a detector. The detection object is provided to one of the vehicle body 2A (see e.g., FIG. 1) and the rotational device 410. The detector is provided to the other of the vehicle body 2A and the rotational device 410. The detector is configured to sense the detection object.

The electronic controller EC1 is configured to calculate the rotational information INF4 based on the deformation amount of the rotational device 410 (e.g., the pedal axle 470) obtained by the force sensor 32. The electronic controller EC1 is configured to calculate the force (e.g., torque) applied to the rotational device 410 based on the deformation amount of the rotational device 410 (e.g., the pedal axle 470) obtained by the force sensor 32. For example, the electronic controller EC1 is configured to calculate, as the rotational information INF4, power INF41 applied to the rotational device 410 based on the torque applied to the rotational device 410 (e.g., the pedal axle 470) and a rotational speed INF42 of the rotational device 410. However, the electronic controller EC1 can be configured to calculate the power INF41 applied to the rotational device 410 based on other data such as a force applied to the rotational device 410 and a rotational speed of the rotational device 410 if needed and/or desired. For example, the electronic controller EC1 can be configured to calculate an average of the power INF41 during one revolution of the crank arm 14. For example, the electronic controller EC1 can be configured to calculate total power during one revolution of the crank assembly 13 by doubling the power INF41 on the only one crank arm.

The electronic controller EC1 is configured to control the wireless communicator WC1 to wirelessly transmit the rotational information INF4 obtained by the force sensor 32. The electronic controller EC1 is configured to control the wireless communicator WC1 to wirelessly transmit, as the rotational information INF4, the power INF41 calculated by the electronic controller EC1 based on the force detected by the force sensor 32. The electronic controller EC1 is configured to control the wireless communicator WC1 to wirelessly transmit the rotational speed INF42 calculated by the electronic controller EC1.

The electrical device 412 includes the connector port 45 to which a cable connector of an electric cable 31 is detachably connectable. The connector port 45 is electrically connected to the electronic controller EC1. In a case where the electric power source 42 includes a secondary battery, the electric power source 42 can be charged via the connector port 45. In such embodiments, the electrical device 412 includes a voltage controller configured to control electricity supplied from an electric power supply via the connector port 45. The electronic controller EC1 can be configured to communicate with another electrical device via the connector port 45 and an electric cable 31 for maintenance such as updating software if needed and/or desired.

The electrical device 412 is configured to communicate with the additional electrical device 6. The additional electrical device 6 is configured to wirelessly receive the rotational information INF4 from the electrical device 412. The additional electrical device 6 is configured to wirelessly transmit the signal SG to the electrical device 412. The electrical device 412 is configured to recognize that the wireless communication is normal between the electrical device 412 and the additional electrical device 6 based on the signal SG.

The description regarding the stopping of the wireless transmission of the rotational information INF can be utilized as the description regarding stopping of the wireless transmission of the rotational information INF4 by replacing the reference numerals "INF1," "INF11," "INF12," "10," and "12" with "INF4," "INF41," "INF42," "410," and "412." Thus, the description regarding the stopping of the wireless transmission of the rotational information INF4 will not be described in detail here for the sake of brevity.

Figure 24:
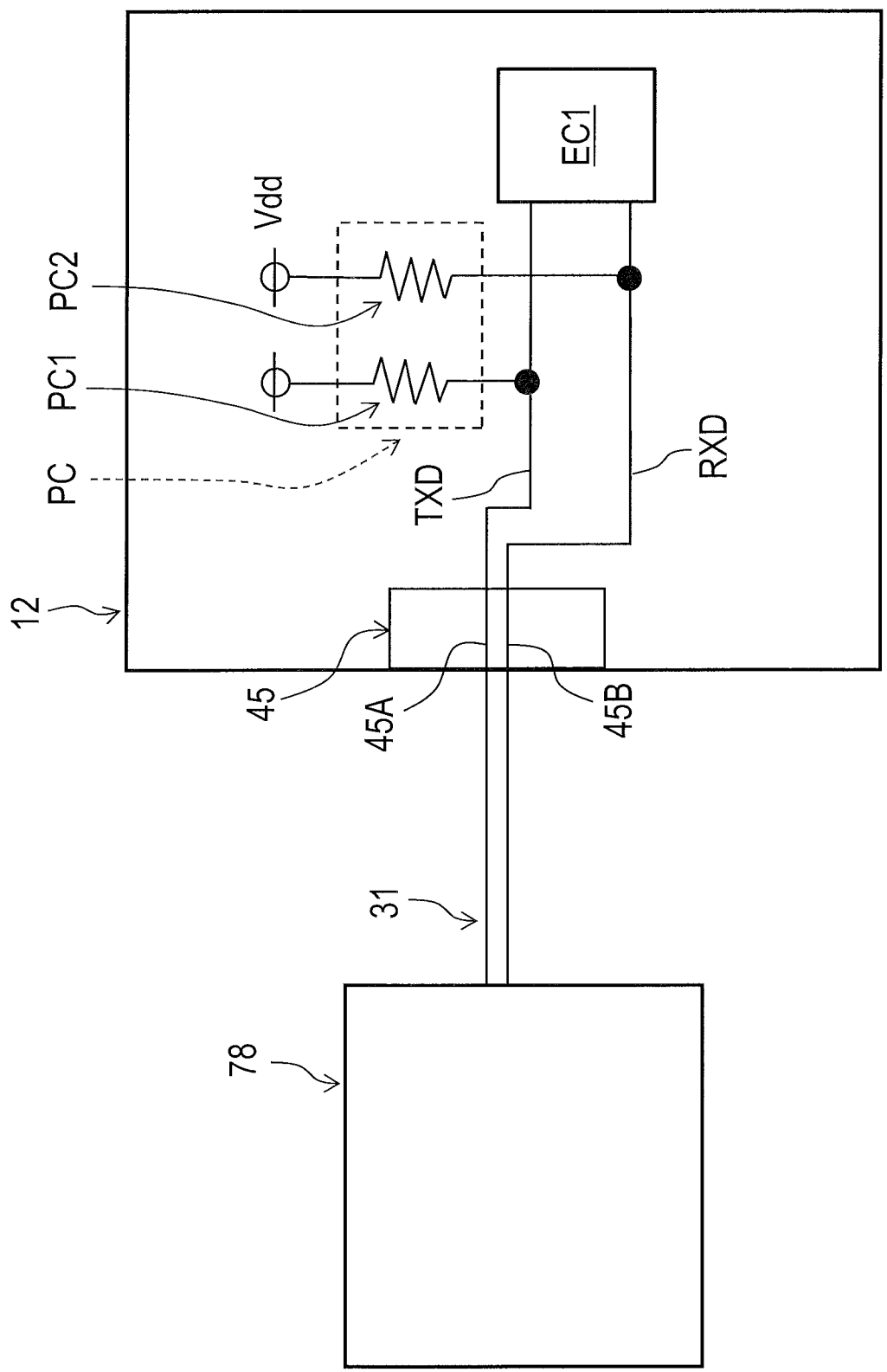
FIGS. 24 and 25 are schematic block diagrams of the rotational device in accordance with a modification.

In each of the above-mentioned embodiments and the modifications thereof, the electric power source 42 is charged using electricity supplied from the external electric power source 62. However, the electric power source 42 can be configured not to be charged (e.g., the electric power source 42 is not rechargeable) or configured to be charged via a port other than the connector port 45 if needed and/or desired. In such embodiments, the communicator circuit WD1 is configured to communicate with another communicator circuit of another device without the PLC. As seen in FIG. 24, for example, the communicator circuit WD1 is configured to communicate with a first external electrical device 78 via the connector port 45 based on asynchronous serial communication. The asynchronous serial communication includes Universal Asynchronous Receiver/Transmitter (UART). The first external electrical device 78 has a structure different from the structure of the second external electrical device 8. In such embodiments, however, in a case where the second external electrical device 8 is electrically connected to the connector port 45 via the electric cable 31 (e.g., the USB cable), the second external electrical device 8 may incorrectly communicate with the rotational device 10 because of difference types of communication.

Figure 25:
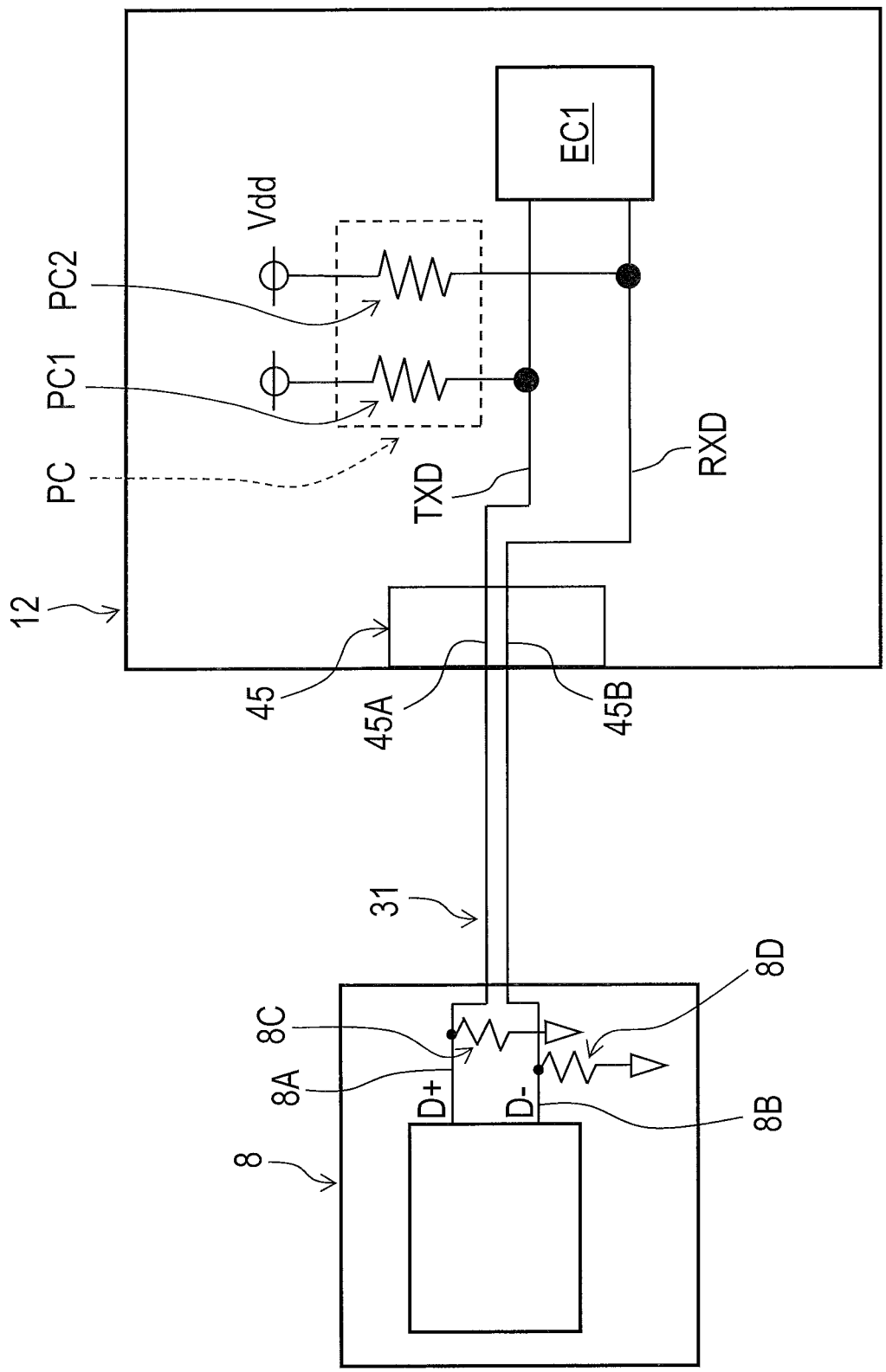

As seen in FIG. 25, the electrical device 12 for the human-powered vehicle 2 comprises a protection circuit PC. The protection circuit PC is electrically connected to the connector port 45 to restrict electrical operation from the second external electrical device 8 to the electronic controller EC1 via the connector port 45. In the present embodiment, the electrical operation includes at least one of power supply and electric communication. The electrical operation includes both the power supply and the electric communication. However, the electrical operation can include only one of the power supply and the electric communication if needed and/or desired.

The protection circuit PC is electrically connected to the connector port 45 to allow communication between the electronic controller EC1 and the first external electrical device 78. The connector port 45 includes a first line 45A electrically connected to the electronic controller EC1. The connector port 45 includes a second line 45B electrically connected to the electronic controller EC1. In the present embodiment, the first line 45A is configured to transmit data via the connector port 45. The second line 45B is configured to receive data via the connector port 45.

The protection circuit PC includes a first pull-up resistor PC1 electrically connected to the first line 45A. The protection circuit PC includes a second pull-up resistor PC2 electrically connected to the second line 45B.

The first pull-up resistor PC1 has a first resistance value. The second pull-up resistor PC2 has a second resistance value. In the present embodiment, the second resistance value is equal to the first resistance value. For example, the first resistance value is higher than or equal to 100 k$\Omega$. The second resistance value is higher than or equal to 100 k$\Omega$. However, the second resistance value can be different from the first resistance value if needed and/or desired. The first resistance value can be lower than 100 k$\Omega$ if needed and/or desired. The second resistance value can be lower than 100 k$\Omega$ if needed and/or desired.

The external electrical device 8 includes a third line 8A and a fourth line 8B. The third line 8A is electrically connected to the first line 45A of the connector port 45 of the electrical device 12. The fourth line 8B is electrically connected to the second line 45B of the connector port 45 of the electrical device 12. The external electrical device 8 includes a first pull-down resistor 8C and a second pull-down resistor 8D. The first pull-down resistor 8C is electrically connected to the third line 8A. The second pull-down resistor 8D is electrically connected to the fourth line 8B.

The first pull-down resistor 8C has a third resistance value. The second pull-down resistor 8D has a fourth resistance value. The first resistance value of the first pull-up resistor PC1 is higher than the third resistance value of the first pull-down resistor 8C. The second resistance value of the second pull-up resistor PC2 is higher than the fourth resistance value of the second pull-down resistor 8D.

The electronic controller EC1 is configured to initially set the first line 45A as an input line when the electronic controller EC1 is turned on. Thus, the third line 8A enters a low state when the third line 8A and the fourth line 8B are electrically connected to the first line 45A and the second line 45B via the electric cable 31.

In each of the above embodiments and the modifications thereof, the electronic controller EC1 can be configured to calculate a circumferential force circumferentially applied to the rotational device 10 by subtracting an estimated radial force from the force sensed by the force sensor 32. The electronic controller EC1 stores the estimated radial force in the hardware memory 30M in advance. For example, the relationship between the estimated radial force and a sensed force is obtained based on experiments. The relationship includes a relational expression between the estimated radial force and the sensed force.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electrical device of a rotational device for a human-powered vehicle, comprising:
    an electronic controller configured to operate with first power consumption in a first state and configured to operate with second power consumption lower than the first power consumption in a second state;
    the electronic controller being configured to change a state of the electrical device from the first state to the second state in a case where a first sleep condition is met for a first sleep determination time in the first state;
    the electronic controller being configured to change the state of the electrical device from the first state to the second state in a case where a second sleep condition is met for a second sleep determination time in the first state, the second sleep determination time being shorter than the first sleep determination time; and
    the electronic controller is configured to change the state of the electrical device from the first state to the second state in a case where the first sleep condition is met for the first sleep determination time after the second sleep condition is not met.

2. The electrical device according to claim 1, wherein the electronic controller is configured to change the state of the electrical device from the first state to the second state in a case where the electronic controller changes the state of the electrical device from the second state to the first state in response to axial acceleration defined in an axial direction parallel to the rotational axis of the rotational device.

3. The electrical device according to claim 1, wherein the electronic controller is configured to change the state of the electrical device from the first state to the second state in a case where the second sleep condition is met for the second sleep determination time after the electronic controller changes the state of the electrical device from the second state to the first state.

4. The electrical device according to claim 1, wherein the electronic controller is configured to maintain the first state in a case where the second sleep condition is not met before the second sleep determination time elapses after the electronic controller changes the state of the electrical device from the second state to the first state.

5. The electrical device according to claim 1, wherein the electronic controller is configured to maintain the first state in a case where the first sleep condition is not met before the first sleep determination time elapses after the second sleep condition is not met.

6. The electrical device according to claim 1, wherein the first sleep condition includes
    that an amount of change in a rotational position sensed by a position sensor is less than a first movement threshold, and
    that a force sensed by a force sensor is lower than a first force threshold.

7. The electrical device according to claim 6, wherein the electronic controller is configured to change the state of the electrical device from the first state to the second state in a case where the amount of change in the rotational position sensed by the position sensor is less than the first movement threshold and where the force sensed by the force sensor is lower than the first force threshold.

8. The electrical device according to claim 1, wherein the second sleep condition includes
    that an amount of change in a rotational position sensed by a position sensor is less than a second movement threshold, and
    that a force sensed by a force sensor is lower than a second force threshold.

9. The electrical device according to claim 8, wherein the electronic controller is configured to change the state of the electrical device from the first state to the second state in a case where the amount of change in the rotational position sensed by the position sensor is less than the second movement threshold and where the force sensed by the force sensor is lower than the second force threshold.

10. The electrical device according to claim 1, further comprising
    the position sensor configured to sense a rotational position of the rotational device.

11. The electrical device according to claim 10, wherein the position sensor is provided on a longitudinal line, and the longitudinal line is defined to intersect with a rotational axis of the rotational device and a center axis of a pedal attachment hole of the rotational device.

12. The electrical device according to claim 10, wherein the position sensor includes an accelerometer, and the accelerometer is configured to sense
    radial acceleration defined in a radial direction with respect to a rotational axis of the rotational device,
    rotational acceleration defined in a rotational direction with respect to the rotational axis, and
    axial acceleration defined an axial direction parallel to the rotational axis of the rotational device.

13. The electrical device according to claim 12, wherein the first movement threshold includes a first radial acceleration threshold and a first rotational acceleration threshold, and
    the first sleep condition includes that an amount of change in the radial acceleration is less than the first radial acceleration threshold and that an amount of change in the rotational acceleration is less than the first rotational acceleration threshold.

14. The electrical device according to claim 12, wherein the electronic controller is configured to change the state of the electrical device from the first state to the second state regardless of the axial acceleration, in a case where the amount of change in the radial acceleration is less than the first radial acceleration threshold for the first sleep determination time and where the amount of change in the rotational acceleration is less than the first rotational acceleration threshold for the first sleep determination time.

15. The electrical device according to claim 14, wherein the second movement threshold includes a second radial acceleration threshold and a second rotational acceleration threshold, and
    the second sleep condition includes that the amount of change in the radial acceleration is less than the second radial acceleration threshold and that the amount of change in the rotational acceleration is less than the second rotational acceleration threshold.

16. The electrical device according to claim 12, wherein the electronic controller is configured to change the state of the electrical device from the first state to the second state regardless of the axial acceleration, in a case where the amount of change in the radial acceleration is less than the second radial acceleration threshold for the second sleep determination time and where the amount of change in the rotational acceleration is less than the second rotational acceleration threshold for the second sleep determination time.

17. The electrical device according to claim 1, wherein the electronic controller is configured to change the state of the electrical device from the second state to the first state in a case where a wake condition is met in the second state.

18. The electrical device according to claim 17, wherein the wake condition includes at least one of
that an amount of change in radial acceleration defined in a radial direction with respect to a rotational axis of the rotational device is greater than a radial acceleration threshold, and
that an amount of change in rotational acceleration defined in a rotational direction with respect to the rotational axis is greater than a rotational acceleration threshold.

19. The electrical device according to claim 18, wherein the electronic controller is configured to change the state of the electrical device from the second state to the first state in at least one of a case where the amount of change in the radial acceleration is greater than the radial acceleration threshold and a case where the amount of change in the rotational acceleration is greater than the rotational acceleration threshold.

20. A rotational device for a human-powered vehicle, comprising:
a crank arm; and
the electrical device according to claim 1.

21. The rotational device according to claim 20, wherein the electrical device is at least partially provided to the crank arm.

22. The rotational device according to claim 20, further comprising:
a crank axle; and
a sprocket, wherein
the crank arm is secured to the crank axle.

23. The rotational device according to claim 22, wherein the electrical device is at least partially provided to at least one of the crank axle, the crank arm, and the sprocket.

24. A rotational device for a human-powered vehicle, comprising:
a pedal axle;
a pedal body rotatably coupled to the pedal axle; and
the electrical device according to claim 1.

25. The rotational device according to claim 24, wherein the electrical device is at least partially provided to at least one of the pedal axle and the pedal body.

26. An electrical device of a rotational device of a human-powered vehicle, comprising:
an electronic controller configured to operate with first power consumption in a first state and configured to operate with second power consumption lower than the first power consumption in a second state;
the electronic controller being configured to change the state of the electrical device from the second state to the first state in a case where a wake condition is met in the second state, the wake condition being free of axial acceleration defined an axial direction parallel to the rotational axis of the rotational device; and
the electronic controller being configured to maintain the second state in a case where the electronic controller recognizes that the axial acceleration changes in the second state.

27. The electrical device according to claim 26, wherein the electronic controller is configured to change a state of the electrical device from the first state to the second state in a case where a first sleep condition is met for a first sleep determination time in the first state, and
the electronic controller is configured to change the state of the electrical device from the first state to the second state in a case where a second sleep condition is met for a second sleep determination time in the first state, the second sleep determination time being shorter than the first sleep determination time.

28. An electrical device of a rotational device for a human-powered vehicle, comprising:
a power-source sensor configured to sense an output voltage of an electric power source;
an electric component configured to be powered by the electric power source; and
an electronic controller electrically connected to the power-source sensor to obtain the output voltage sensed by the power-source sensor in response to power supply from the electric power source to the electric component, the electronic controller being configured to calculate a level of charge of the electric power source based on the output voltage.

29. The electrical device according to claim 28, wherein the electronic controller is configured to obtain, as a first output voltage, the output voltage sensed by the power-source sensor in response to the power supply,
the electronic controller is configured to obtain, as a second output voltage, the output voltage sensed by the power-source sensor in response to decrease in the power supply, and
the electronic controller is configured to calculate the level of charge of the electric power source based on the first output voltage and the second output voltage.

30. The electrical device according to claim 28, wherein the electric component includes a wireless communicator, and
the electronic controller is configured to obtain the output voltage sensed by the power-source sensor in response to power supply from the electric power source to the wireless communicator.

31. The electrical device according to claim 28, wherein the electric component includes a light emitter, and
the electronic controller is configured to obtain the output voltage sensed by the power-source sensor in response to power supply from the electric power source to the light emitter.

32. The electrical device according to claim 28, wherein the level of charge includes a state-of-charge of the electric power source, and
the electronic controller is configured to calculate the state-of-charge based on the output voltage.

33. An electrical device of a rotational device for a human-powered vehicle, comprising:
an electric power source which is rechargeable;
a connector port to which a charging power source is electrically connected;
an electronic controller configured to be powered by the charging power source without being powered by the electric power source in a state where electricity is supplied from the charging power source to the connector port; and a switching circuit electrically connected to the electric power source, the connector port, and the electronic controller to change power supply between the electric power source and the charging power source.

34. The electrical device according to claim 33, wherein the electric power source is electrically connected to the connector port, and
the electronic controller is configured to control supply of electricity from the charging power source to the electric power source via the connector port to charge the electric power source.

35. The electrical device according to claim 34, wherein the electronic controller is configured to be powered by the electric power source in a state where electricity is not supplied from the charging power source to the connector port.

36. The electrical device according to claim 35, wherein the electronic controller is configured to be powered by the charging power source in a state where electricity is supplied from the charging power source to the electric power source via the connector port.

37. An electrical device for a human-powered vehicle, comprising:
a connector port to which an electric cable is detachably connected;
an electronic controller electrically connected to the connector port to communicate with a first external electrical device via the connector port and the electric cable; and
a protection circuit electrically connected to the connector port to restrict electrical operation from a second external electrical device to the electronic controller via the connector port.

38. The electrical device according to claim 37, wherein the electrical operation includes at least one of power supply and electric communication.

39. The electrical device according to claim 37, wherein the protection circuit is electrically connected to the connector port to allow communication between the electronic controller and the first external electrical device.

40. The electrical device according to claim 37, wherein the connector port includes a first line electrically connected to the electronic controller, and
the protection circuit includes a first pull-up resistor electrically connected to the first line.

41. The electrical device according to claim 40, wherein the first pull-up resistor has a first resistance value, and the first resistance value is higher than or equal to 100 kΩ.

42. The electrical device according to claim 40, wherein the connector port includes a second line electrically connected to the electronic controller, and
the protection circuit includes a second pull-up resistor electrically connected to the second line.

43. The electrical device according to claim 42, wherein the second pull-up resistor has a second resistance value, and
the second resistance value is higher than or equal to 100 kΩ.

44. The electrical device according to claim 42, wherein the first pull-up resistor has a first resistance value,
the second pull-up resistor has a second resistance value, and
the second resistance value is equal to the first resistance value.

45. The electrical device according to claim 37, wherein the electronic controller includes a communicator circuit configured to communicate with the first external electrical device via the connector port based on asynchronous serial communication.

* * * * *